United States Patent
Liu et al.

(10) Patent No.: US 11,867,594 B2
(45) Date of Patent: Jan. 9, 2024

(54) EVALUATION METHOD AND EVALUATION DEVICE OF HEALTH STATE OF WELL SITE EQUIPMENT, AND STORAGE MEDIUM

(71) Applicant: YANTAI JEREH PETROLEUM EQUIPMENT & TECHNOLOGIES CO., LTD., Shandong (CN)

(72) Inventors: Kaishen Liu, Shandong (CN); Yuanjie Xie, Shandong (CN); Shouzhe Li, Shandong (CN); Zhuqing Mao, Shandong (CN); Hao Yang, Shandong (CN); Weiwei Liu, Shandong (CN); Kai Wang, Shandong (CN); Shuzhen Cui, Shandong (CN)

(73) Assignee: YANTAI JEREH PETROLEUM EQUIPMENT & TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/747,626

(22) Filed: May 18, 2022

(65) Prior Publication Data
US 2023/0092705 A1 Mar. 23, 2023

(30) Foreign Application Priority Data
Sep. 23, 2021 (CN) .......................... 202111117023.7

(51) Int. Cl.
*G06F 11/30* (2006.01)
*G01M 99/00* (2011.01)
(Continued)

(52) U.S. Cl.
CPC .......... *G01M 99/005* (2013.01); *G06Q 10/20* (2013.01); *G06Q 50/02* (2013.01)

(58) Field of Classification Search
CPC .................................................. G01M 99/005
See application file for complete search history.

(56) References Cited

FOREIGN PATENT DOCUMENTS

| AU | 2021103409 | * | 8/2021 |
| AU | 2021103409 A4 | | 8/2021 |

(Continued)

OTHER PUBLICATIONS

First Search for Chinese Application No. 202111117023.7 dated Apr. 24, 2023.
(Continued)

*Primary Examiner* — Phuong Huynh

(57) ABSTRACT

An evaluation method and an evaluation device for evaluating a health state of well site equipment, and a storage medium are provided. The evaluation method for evaluating the health state of the well site equipment includes: obtaining operating parameters of a component to be tested of equipment to be tested in at least one dimension, the at least one dimension including an operating data dimension, an environmental data dimension, and a maintenance data dimension; obtaining evaluation values of a health state of the component to be tested in various dimensions based on the operating parameters of the various dimensions; obtaining a comprehensive evaluation value of the health state of the component to be tested based on the evaluation values of the health state of the component to be tested in the various dimensions.

17 Claims, 12 Drawing Sheets

(51) Int. Cl.
*G06Q 10/20* (2023.01)
*G06Q 50/02* (2012.01)

(56) References Cited

FOREIGN PATENT DOCUMENTS

| | | | |
|---|---|---|---|
| CN | 106199305 A | | 12/2016 |
| CN | 209085657 | * | 7/2019 |
| CN | 112555690 A | | 3/2021 |
| CN | 112561352 A | | 3/2021 |
| CN | 112595537 A | | 4/2021 |
| CN | 112650654 A | | 4/2021 |
| CN | 112765560 A | | 5/2021 |
| CN | 112801525 | * | 5/2021 |
| CN | 112801525 A | | 5/2021 |
| WO | 2021027213 A1 | | 2/2021 |

OTHER PUBLICATIONS

Li et al., "Study on Fuzzy Mathematics Model in Risk Assessment of Combined—Station in Oilfields," Petrochemical Safety and Environmental Protection Technology, vol. 24, No. 6, Dec. 20, 2008.

Shen et al., "Railway Passenger Station Equipment—Research on Fault Diagnosis Evaluation System and Multi- attribute Analysis Model," China Plant Engineering, Apr. 2020, English abstracted provided.

Sun et al., "Discussion on concept and evaluation index of gas well integrity," Journal of Safety Science and Technology, vol. 11, No. 10, Oct. 2015, English abstract provided.

Written Opinion and International Search Report for International Application No. PCT/CN2021/128140 dated Jun. 20, 2022.

* cited by examiner

EVALUATION METHOD AND EVALUATION DEVICE OF HEALTH STATE OF WELL SITE EQUIPMENT, AND STORAGE MEDIUM

CROSS-REFERENCE TO RELATED APPLICATION

The present application claims the Chinese Patent Application No. 202111117023.7, filed on Sep. 23, 2021, and the entire content disclosed by the Chinese patent application is incorporated herein by reference as part of the present application for all purposes under the U.S. laws.

TECHNICAL FIELD

The embodiments of the present disclosure relate to an evaluation method and an evaluation device of a health state of well site equipment, and a storage medium.

BACKGROUND

A well site is a site composed of a wellhead and other ground mechanical equipment and used for exploiting underground oil, natural gas, and other resources. According to the oil production method, the well sites can be divided into: (1) spouting-automatically oil production well site, which relies on the pressure of the underground oil layer to make crude oil continuously blow out from the bottom of the well to the wellhead and flow to the metering station through the wellhead facilities, the ground equipment mainly includes Christmas trees, water jacket heating furnace, and oil-gas separator, etc.; (2) mechanical oil production well site, which is a well site that uses mechanical methods to extract oil under the conditions of low underground pressure and the oil well not having the self-blowing capability. For example, the construction operation projects of oil-gas field well sites have the characteristics of complex technology, multiple cross-operations, large construction span, and many cooperative units.

SUMMARY

At least one embodiment of the present disclosure discloses an evaluation method for evaluating a health state of well site equipment, comprising: obtaining operating parameters of a component to be tested of equipment to be tested in at least one dimension, wherein the at least one dimension comprises an operating data dimension, an environmental data dimension, and a maintenance data dimension; obtaining evaluation values of a health state of the component to be tested in various dimensions based on the operating parameters of the various dimensions, wherein an operating parameter of the operating data dimension comprises operating data, an operating parameter of the environmental data dimension comprises environmental data, and an operating parameter of the maintenance data dimension comprises maintenance data; and obtaining a comprehensive evaluation value of the health state of the component to be tested based on the evaluation values of the health state of the component to be tested in the various dimensions.

For example, the evaluation method provided by at least one embodiment of the present disclosure further comprises: according to the comprehensive evaluation value of the health state of the component to be tested, performing a fault prediction on the component to be tested and implementing corresponding maintenance measures.

For example, in the evaluation method provided by at least one embodiment of the present disclosure, the equipment to be tested comprises at least one component to be tested, and the evaluation method further comprises: according to the comprehensive evaluation value of the at least one component to be tested, obtaining a comprehensive evaluation value of the equipment to be tested, and monitoring a health state of the equipment to be tested according to the comprehensive evaluation value of the equipment to be tested.

For example, in the evaluation method provided by at least one embodiment of the present disclosure, a calculation formula for an evaluation value of the health state of the component to be tested in any one of the operating data dimension, the environmental data dimension, and the maintenance data dimension is:

$$P = \sum_{t=0}^{T} K_t P_t, \text{ and } \sum_{t=0}^{T} K_t = 1, \quad \text{formula (1)}$$

where Kt is a weight coefficient of a t-th operating parameter, Pt is a scoring coefficient of the t-th operating parameter, t is an integer greater than or equal to 0 and less than or equal to T, and T is a count of the operating parameters and is an integer greater than or equal to 1.

For example, in the evaluation method provided by at least one embodiment of the present disclosure, a calculation formula of the comprehensive evaluation value of the health state of the component to be tested is:

$$H = (R * W_R \pm U * W_U \pm M * W_M) * C_R * C_U * C_M, \quad \text{formula (5)}$$

wherein H is the comprehensive evaluation value of the health state of the component to be tested,
R is the evaluation value of the health state of the component to be tested in the operating data dimension and is obtained according to the formula (1),
U is the evaluation value of the health state of the component to be tested in the environmental data dimension and is obtained according to the formula (1),
M is the evaluation value of the health state of the component to be tested in the maintenance data dimension and is obtained according to the formula (1),
$W_R$ is a weight coefficient of the operating data dimension,
$W_U$ is a weight coefficient of the environmental data dimension, and
$W_M$ is a weight coefficient of the maintenance data dimension,
wherein $W_R + W_U + W_M = 1$,
$C_R$ is a fault coefficient of the operating data dimension,
$C_U$ is a fault coefficient of the environmental data dimension,
$C_M$ is a fault coefficient of the maintenance data dimension, and values of $C_R$, $C_U$, and $C_W$ are 0 or 1.

For example, in the evaluation method provided by at least one embodiment of the present disclosure, the component to be tested comprises a power component, an execution component, and a manifold component.

For example, in the evaluation method provided by at least one embodiment of the present disclosure, the power component comprises a frequency converter unit, an electric motor, an engine, and a gearbox, which are driven by electricity; the execution component comprises a plunger pump and a centrifugal pump; and the manifold component comprises a high-pressure valve and a high-pressure manifold in the well site.

For example, in the evaluation method provided by at least one embodiment of the present disclosure, obtaining the operating parameters of the component to be tested in the at least one dimension, comprises: obtaining operating parameters of the frequency converter unit, obtaining the operating parameters of the frequency converter unit comprises: obtaining an output power, an output voltage, an output current, a rectifier bridge temperature, and an inverter temperature of the frequency converter unit to obtain operating data of the frequency converter unit; obtaining an environmental temperature, an environmental humidity, an altitude, and geographic coordinates of the frequency converter unit to obtain environmental data of the frequency converter unit; and obtaining a coolant level, an operating duration, and a count of switching times of a circuit breaker of the frequency converter unit to obtain maintenance data of the frequency converter unit.

For example, in the evaluation method provided by at least one embodiment of the present disclosure, obtaining the operating parameters of the component to be tested in the at least one dimension, comprises: obtaining operating parameters of the electric motor, obtaining the operating parameters of the electric motor comprises: obtaining an output power, an operating voltage, an operating current, an operating speed, a winding temperature, and a bearing temperature of the electric motor to obtain operating data of the electric motor; obtaining an environmental temperature, an environmental humidity, an altitude, and geographic coordinates of the electric motor to obtain environmental data of the electric motor; and obtaining an operating duration and grease injection time of the electric motor to obtain maintenance data of the electric motor.

For example, in the evaluation method provided by at least one embodiment of the present disclosure, obtaining the operating parameters of the component to be tested in the at least one dimension, comprises: obtaining operating parameters of the engine, obtaining the operating parameters of the engine comprises: obtaining load information, an engine oil pressure, a coolant temperature, an operating speed, an engine-oil-supply pressure, and a system voltage of the engine to obtain operating data of the engine; obtaining an environmental temperature, an environmental humidity, an altitude, geographic coordinates of the engine to obtain environmental data of the engine; and obtaining an operating duration, filter element replacement time, engine oil replacement time, and a coolant level of the engine to obtain maintenance data of the engine.

For example, in the evaluation method provided by at least one embodiment of the present disclosure, obtaining the operating parameters of the component to be tested in the at least one dimension, comprises: obtaining operating parameters of the gearbox; obtaining the operating parameters of the gearbox comprises: obtaining an engine oil pressure, an engine oil temperature, an input rotational speed, and an output rotational speed of the gearbox to obtain operating data of the gearbox; obtaining an environmental temperature, an environmental humidity, an altitude, and geographic coordinates of the gearbox to obtain environmental data of the gearbox; and obtaining an operating duration, filter element replacement time, and engine oil replacement time of the gearbox to obtain maintenance data of the gearbox.

For example, in the evaluation method provided by at least one embodiment of the present disclosure, obtaining the operating parameters of the component to be tested in the at least one dimension, comprises: obtaining operating parameters of the plunger pump; obtaining the operating parameters of the plunger pump comprises: obtaining a lubricating oil pressure, a lubricating oil temperature, a bearing temperature, vibration data, and a plunger temperature of the plunger pump to obtain operating data of the plunger pump; obtaining an environmental temperature, an environmental humidity, an altitude, and geographic coordinates of the plunger pump to obtain environmental data of the plunger pump; and obtaining an operating duration, filter element replacement time, lubricating oil replacement time, pump head replacement time, and a count of plunger strokes of the plunger pump to obtain maintenance data of the plunger pump.

For example, in the evaluation method provided by at least one embodiment of the present disclosure, obtaining the operating parameters of the component to be tested in the at least one dimension, comprises: obtaining operating parameters of the centrifugal pump; obtaining the operating parameters of the centrifugal pump comprises: obtaining a power output, a bearing temperature, an operating speed, a liquid flow, a liquid pressure, and a liquid density of the centrifugal pump to obtain operating data of the centrifugal pump; obtaining an environmental temperature, an environmental humidity, an altitude, and geographic coordinates of the centrifugal pump to obtain environmental data of the centrifugal pump; and obtaining an operating duration and grease injection time of the centrifugal pump to obtain maintenance data of the centrifugal pump.

For example, in the evaluation method provided by at least one embodiment of the present disclosure, obtaining the operating parameters of the component to be tested in the at least one dimension, comprises: obtaining operating parameters of the high-pressure valve, obtaining the operating parameters of the high-pressure valve comprises: obtaining a liquid flow, a liquid pressure, a liquid density, and a sand-liquid ratio of the high-pressure valve to obtain operating data of the high-pressure valve; obtaining an environmental temperature, an environmental humidity, an altitude, and geographic coordinates of the high-pressure valve to obtain environmental data of the high-pressure valve; and obtaining an operating duration, grease injection time, and a count of switching times of the high-pressure valve to obtain maintenance data of the high-pressure valve.

For example, in the evaluation method provided by at least one embodiment of the present disclosure, obtaining the operating parameters of the component to be tested in the at least one dimension, comprises: obtaining operating parameters of the high-pressure manifold; obtaining the operating parameters of the high-pressure manifold comprises: obtaining a liquid flow, a liquid pressure, a liquid density, and a sand-liquid ratio of the high-pressure manifold to obtain operating data of the high-pressure manifold; obtaining an environmental temperature, an environmental humidity, an altitude, and geographic coordinates of the high-pressure manifold to obtain environmental data of the high-pressure manifold; and obtaining an operating duration and a manifold wall thickness of the high-pressure manifold to obtain maintenance data of the high-pressure manifold.

At least one embodiment of the present disclosure also provides an evaluation device for evaluating a health state of well site equipment, comprising: a first obtaining unit, configured to obtain operating parameters of a component to be tested of equipment to be tested in at least one dimension, the at least one dimension comprising an operating data dimension, an environmental data dimension, and a maintenance data dimension; a second obtaining unit, configured to obtain evaluation values of a health state of the component to be tested in various dimensions based on the operating parameters, an operating parameter of the operating data dimension comprising operating data, an operating parameter of the environmental data dimension comprises environmental data, and an operating parameter of the maintenance data dimension comprises maintenance data; a third obtaining unit, configured to obtain a comprehensive evaluation value of the health state of the component to be tested based on the evaluation values of the health state of the component to be tested in the various dimensions.

At least one embodiment of the present disclosure also provides an evaluation device for evaluating a health state of well site equipment, comprising: a processor; a memory; and one or more computer program modules, wherein the one or more computer program modules are stored in the memory and configured to be executed by the processor, and the one or more computer program modules comprises a method for implementing the evaluation method for evaluating the health state of the well site equipment provided by any embodiment of the present disclosure.

At least one embodiment of the present disclosure also provides a storage medium, non-temporarily storing computer-readable instructions, wherein when the computer-readable instructions are executed by a computer, the evaluation method for evaluating the health state of the well site equipment provided by any embodiment of the present disclosure can be executed.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
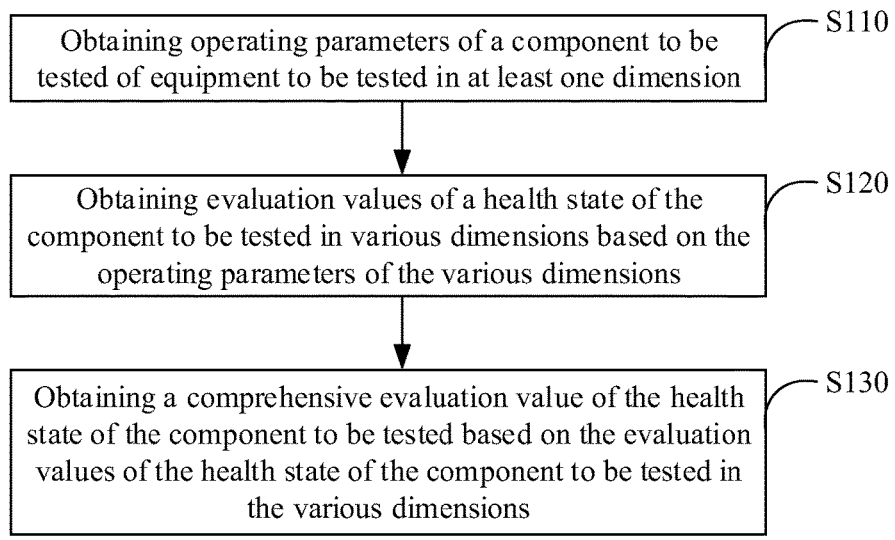
FIG. 1 is a flowchart of an evaluation method for evaluating a health state of well site equipment provided by at least one embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Shale gas is natural gas extracted from shale formations, and is an important unconventional natural gas resource, mainly composed of methane, the formation and enrichment of the shale gas has its own unique characteristics, and the shale gas is often distributed in the thick and widely distributed shale bottom layer in the basin. Compared with conventional natural gas, shale gas is more difficult to develop and requires higher construction equipment and processes.

Fracturing refers to a method that uses hydraulic action to form cracks in oil-gas layers in the process of oil or gas production, and is also called hydraulic fracturing. Fracturing equipment generally includes fracturing equipment used to pump high-pressure fluid into the well, sand mixing equipment used to mix proppant and fracturing fluid and supply fluid to the fracturing equipment, and instrumentation equipment used to monitor the entire equipment group. The operation and maintenance of traditional well site equipment is only based on experience or replacement of components after failures. However, relying on experience to maintain the well site equipment, due to the lack of professional equipment performance monitoring models and maintenance data support, it is impossible to understand the working conditions of various components in real time, thereby leading to phenomena, for example, excessive maintenance will lead to an increase in the overall maintenance cost of the well site equipment, and improper maintenance will lead to an increase in the downtime rate of the well site equipment, which will affect the normal production of the well site equipment.

At least one embodiment of the present disclosure provides an evaluation method for evaluating a health state of well site equipment, comprising: obtaining operating parameters of a component to be tested of equipment to be tested in at least one dimension, the at least one dimension comprising an operating data dimension, an environmental data dimension, and a maintenance data dimension; obtaining evaluation values of a health state of the component to be tested in various dimensions based on the operating parameters of the various dimensions, an operating parameter of the operating data dimension comprising operating data, an operating parameter of the environmental data dimension comprising environmental data, and an operating parameter of the maintenance data dimension comprising maintenance data; obtaining a comprehensive evaluation value of the health state of the component to be tested based on the evaluation values of the health state of the component to be tested in the various dimensions.

At least one embodiment of the present disclosure also provides an evaluation device and storage medium corresponding to the above-mentioned evaluation method for evaluating the health state of the well site equipment.

The evaluation method for evaluating the health state of the well site equipment provided by the embodiments of the present disclosure can monitor the operating parameters of important components in real time, evaluate the health states of the components based on the operating parameters, and generate the evaluation values of the health states of the components in real time, the operator can monitor the health state of the equipment according to the evaluation values of the health states of the components, so that the equipment with a low health state can be maintained and overhauled in time, thereby reducing the abnormal downtime of the equipment, ensuring the normal operation of the equipment, and improving production efficiency.

The embodiments of the present disclosure and some examples thereof will be described in detail below with reference to the accompanying drawings.

At least one embodiment of the present disclosure provides an evaluating method for evaluating a health state of well site equipment. FIG. 1 is a flowchart of an evaluation method for evaluating a health state of well site equipment provided by at least one embodiment of the present disclosure. The evaluating method for evaluating the health state of the well site equipment provided by at least one embodiment of the present disclosure will be described in detail below with reference to FIG. 1. For example, in some examples, as shown in FIG. 1, the evaluating method for evaluating the health state of the well site equipment includes step S110 to step S130.

Step S110: obtaining operating parameters of a component to be tested of equipment to be tested in at least one dimension;

Step S120: obtaining evaluation values of a health state of the component to be tested in various dimensions based on the operating parameters of the various dimensions;

Step S130: obtaining a comprehensive evaluation value of the health state of the component to be tested based on the evaluation values of the health state of the component to be tested in the various dimensions.

In step S110, for example, in some examples, the at least one dimension comprises an operating data dimension, an environmental data dimension, and a maintenance data dimension. Of course, other dimensions may also be included, and the embodiments of the present disclosure do not limit this case.

For example, a control system collects various parameters of the component to be tested in real time, for example, collects the operating parameters of each component to be tested from the three dimensions, that is, the operating data dimension, the environmental data dimension, and the maintenance data dimension.

In step S120, for example, in some examples, the control system obtains the parameters in the operating data dimension when the component to be tested operates and records the parameters as operating data, the control system obtains the parameters in the environmental data dimension when the component to be tested operates and records the parameters as environmental data, and the control system obtains the parameters in the maintenance data dimension when the component to be tested operates and records the parameters as maintenance data.

For example, the operating parameters of the operating data dimension comprise the operating data, the operating parameters of the environmental data dimension comprise the environmental data, and the operating parameters of the maintenance data dimension comprise the maintenance data.

In the step S120, for example, the calculation formula for the evaluation value of the health state of the component to be tested in any one selected from a group consisting of the operating data dimension, the environmental data dimension, and the maintenance data dimension is:

$$P = \sum_{t=0}^{T} K_t P_t, \text{ and } \sum_{t=0}^{T} K_t = 1 \quad \text{formula (1)}$$

where Kt is a weight coefficient of a t-th operating parameter, Pt is a scoring coefficient of the t-th operating parameter, t is an integer greater than or equal to 0 and less than or equal to T, and T is the number of the operating parameters, and is an integer greater than or equal to 1.

For example, based on the above formula (1), the calculation formula for the evaluation value of the health state of the component to be tested in the operating data dimension is:

$$R = \sum_{i=0}^{n} K_i R_i, \text{ and } \sum_{i=0}^{n} K_i = 1, \quad \text{formula (2)}$$

where, $K_i$ is a weight coefficient of an i-th operating data, $R_i$ is a scoring coefficient of the i-th operating data, i is an integer greater than or equal to 0 and less than or equal to n, n is the number of the operating data, and is an integer greater than or equal to 1.

For example, hereinafter, the embodiments are described by taking a case, where the operating data of the frequency converter unit includes 5 parameters such as output power, output voltage, output current, rectifier bridge temperature, and inverter temperature, as an example. For example, in this example, n=5, Ki represents the weight coefficient of each parameter, for example, the sum of the 5 weight coefficients is 1. The weight coefficient of each parameter can be set according to the criticality of the parameter operating and the influence of the parameter on the performance of the equipment.

For example, the initial score value (i.e., the initial Ri) of each parameter (i.e., each operating data) is 100 points, the current operating data and the operating data at the time of alarm or the operating data at the time of failure occurring are compared and calculated to form the scoring coefficients of various parameters. For example, when this operating data exceeds the operating data at the time of the alarm, a certain score value will be subtracted to obtain the scoring coefficient of this operating data; when the operating data exceeds the operating data at the time of failure occurring, the score value of this operating data is directly 0, that is, the scoring coefficient Ri is 0.

Figure 2:
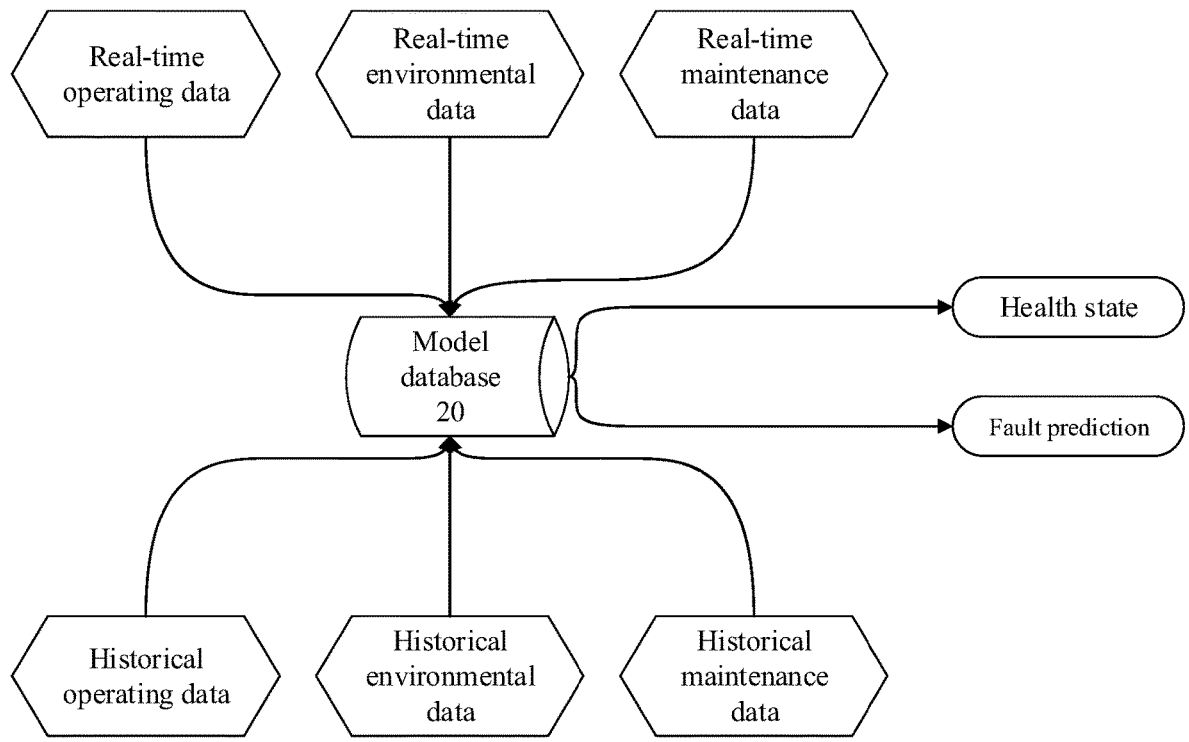
FIG. 2 is a schematic diagram of a model database provided by at least one embodiment of the present disclosure.

For example, the current operating data is the real-time operating data as shown in FIG. 2, and the operating data at the time of alarm or the operating data at the time of failure occurring is the historical operating data as shown in FIG. 2.

For example, based on the above formula (1), the calculation formula for the evaluation value of the health state of the component to be tested in the environmental data dimension is:

$$U = \sum_{j=0}^{m} K_j U_j, \text{ and } \sum_{j=0}^{m} K_j = 1, \quad \text{formula (3)}$$

where, Kj is the weight coefficient of the j-th environmental data, Uj is the scoring coefficient of the j-th environmental data, j is an integer greater than or equal to 0 and less than or equal to m, and m is the number of items of the environmental data, and is an integer greater than or equal to 1.

For example, hereinafter, the embodiments are described by taking a case, where the environmental data of the frequency converter unit includes four parameters: environmental temperature, environmental humidity, altitude, and geographic coordinates, as an example. For example, in this example, m=4, Kj represents the weight coefficient of each parameter, for example, the sum of the 4 weight coefficients is 1. The weight coefficient of each parameter can be set according to the criticality of the parameter operating and the influence of the parameter on the performance of the equipment.

For example, the initial score value (i.e., the initial Uj) of each parameter is 100 points, the current environmental parameter and the environmental data at the time of alarm or the environmental data at the time of failure occurring are compared and calculated to form the scoring coefficient of each environmental parameter (that is, each parameter). For example, in a case where the current maximum environmental temperature for the equipment operating is 60° C., and the ideal environmental temperature for the equipment operating is 30° C. When the environmental temperature increases or decreases, the scoring coefficient will decrease accordingly, when the environmental temperature exceeds the allowable limit of the environmental temperature, the scoring coefficient Uj of this parameter is directly 0 points.

For example, the current environmental parameter is the real-time environmental data as shown in FIG. 2, and the environmental data at the time of alarm or the environmental data at the time of failure occurring is the historical environmental data as shown in FIG. 2.

For example, based on the above formula (1), the calculation formula for the evaluation value of the health state of the component to be tested in the maintenance data dimension is:

$$M = \sum_{l=0}^{L} K_l M_l, \text{ and } \sum_{l=0}^{L} K_l = 1, \quad \text{formula (4)}$$

where, $K_t$ is the weight coefficient of the l-th maintenance data, $M_t$ is the scoring coefficient of the l-th maintenance data, l is an integer greater than or equal to 0 and less than or equal to L, L is the number of items of the maintenance data, and is an integer greater than or equal to 1.

For example, hereinafter, the embodiments are described by taking a case, where the maintenance data of the frequency converter unit includes three parameters: coolant level, operating duration, and the number of switching times of the circuit breaker, as an example. For example, in this example, l=3, $K_t$ represents the weight coefficient of each parameter, for example, the sum of the 3 weight coefficients is 1. The weight coefficient of each parameter can be set according to the criticality of the parameter operating and the influence of the parameter on the performance of the equipment.

For example, the initial score value (i.e., the initial $M_t$) of each parameter is 100 points, and each parameter is scored according to the maintenance situation of the equipment currently. For example, the replacement period of an oil product is 6 months, and the scoring coefficient $M_i$ of this parameter is 100 points when the oil product is just replaced, and the scoring coefficient $M_i$ of this parameter will be gradually deducted as the use duration increases. When the use duration of the oil product exceeds the expected period, the scoring factor $M_i$ of this parameter is directly 0 points.

For example, the maintenance situation of the equipment currently is the real-time maintenance data as shown in FIG. 2, and the use duration and expected period can be the historical maintenance data as shown in FIG. 2.

It should be noted that for the setting method of the weight coefficients and scoring coefficients of other operating parameters, reference may be made to the above descriptions of the operating data, the environmental data, and the maintenance data of the frequency converter unit, which will not be repeated here.

For step S130, for example, the evaluation values of the health state of the component to be tested in various dimensions includes the evaluation value R of the health state of the component to be tested in the operating data dimension calculated in step S120, the evaluation value U of the health state of the component to be tested in the environmental data dimension calculated in step S120, and the evaluation value W of the health state of the component to be tested in the maintenance data dimension calculated in step S120.

For example, a calculation formula of the comprehensive evaluation value of the health state of the component to be tested is:

$$H = (R*W_R \pm U*W_U \pm M*W_M)*C_R*C_U*C_M \quad \text{formula (5)}$$

where H is the comprehensive evaluation value of the health state of the component to be tested, R is the evaluation value of the health state of the component to be tested in the operating data dimension, U is the evaluation value of the health state of the component to be tested in the environmental data dimension, M is the evaluation value of the health state of the component to be tested in the maintenance data dimension, $W_R$ is a weight coefficient of the operating data dimension, $W_U$ is a weight coefficient of the environmental data dimension, $W_M$ is a weight coefficient of the maintenance data dimension, where $W_R + W_U + W_M = 1$, $C_R$ is a fault coefficient of the operating data dimension, $C_U$ is a fault coefficient of the environmental data dimension, $C_M$ is a fault coefficient of the maintenance data dimension, values of $C_R$, $C_U$, and $C_W$ are 0 or 1.

For example, in a case where the evaluation value of each dimension is 0 points, the values of CR, CU, and CW are 0, and in a case where the evaluation value of each dimension is not 0 points, the values of CR, CU, and CW are 1.

For example, the R, U, W, and H can all be calculated in the model database 20 shown in FIG. 2. For example, the model database 20 stores the calculation formulas of the above-mentioned evaluation values and the comprehensive evaluation value.

For example, the evaluation method further includes: according to the comprehensive evaluation value of the health state of the component to be tested, performing a fault prediction on the component to be tested and implementing corresponding maintenance measures.

For example, the classification level of the comprehensive evaluation value is expressed as follows: if the score is less than 60, the component to be tested is in an unhealthy state and needs to be shut down for maintenance; if the score is less than 65, the component to be tested is in a critical health state, reminding the equipment maintenance personnel to pay attention, and analyze the reasons for the decline in the health level; if the score is between 65 and 75, the component to be tested belongs to a qualified health state, performing normal preventive maintenance on the component to be tested in accordance with the requirements of the regulations; if the score is between 75 and 85, the component to be tested belongs to a good health state, the maintenance period can be appropriately extended; if the score is more than 85, the component to be tested belongs to an excellent health state and can operate for a long time in this state.

As a result, the operator can monitor the health state of the equipment according to the evaluation value of the health state of the components, so that the equipment with a lower health state can be maintained and overhauled in time, thereby reducing the abnormal downtime of the equipment, ensuring the normal operation of the equipment, and improving the production efficiency.

For example, the equipment to be tested includes at least one component to be tested, and the method further comprises: according to the comprehensive evaluation value of the at least one component to be tested, obtaining a comprehensive evaluation value of the equipment to be tested, and monitoring a health state of the equipment to be tested according to the comprehensive evaluation value of the equipment to be tested.

For example, the method can achieve real-time monitoring of the health of the components of the equipment based on the operating situation, the maintenance situation, the environment temperature, the operating hours, and the like of the components of the equipment, and establish an operating model based on the data, calculate the health state of the components, and provide early warning of failures based on this.

Figure 3:
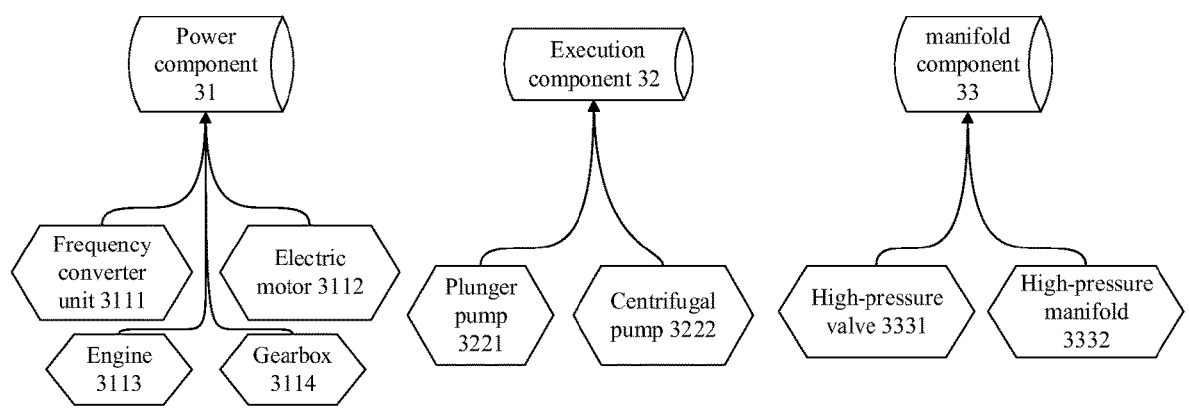
FIG. 3 is a schematic diagram of various components of the well site equipment provided by at least one embodiment of the present disclosure.

For example, as shown in FIG. 3, the at least one component to be tested may include a power component 31, an execution component 32, and a manifold component 33.

For example, as shown in FIG. 3, the power component 31 includes a frequency converter unit 3111, an electric motor 3112, an engine 3113, a gearbox 3114, which are driven by electricity, and other components, for example, the engine 3113 is a fuel-driven engine 3113; the execution component 32 includes components such as a plunger pump 3221 and a centrifugal pump 3222; the manifold component 33 includes components such as a high-pressure valve 3331 and a high-pressure manifold 3332 in the well site.

For example, the power component 31 provides power for the operation equipment and is an important part of the operation equipment. The power component 31 can establish a corresponding model according to the following aspects according to its operating characteristics and on-site use conditions.

Figure 4:
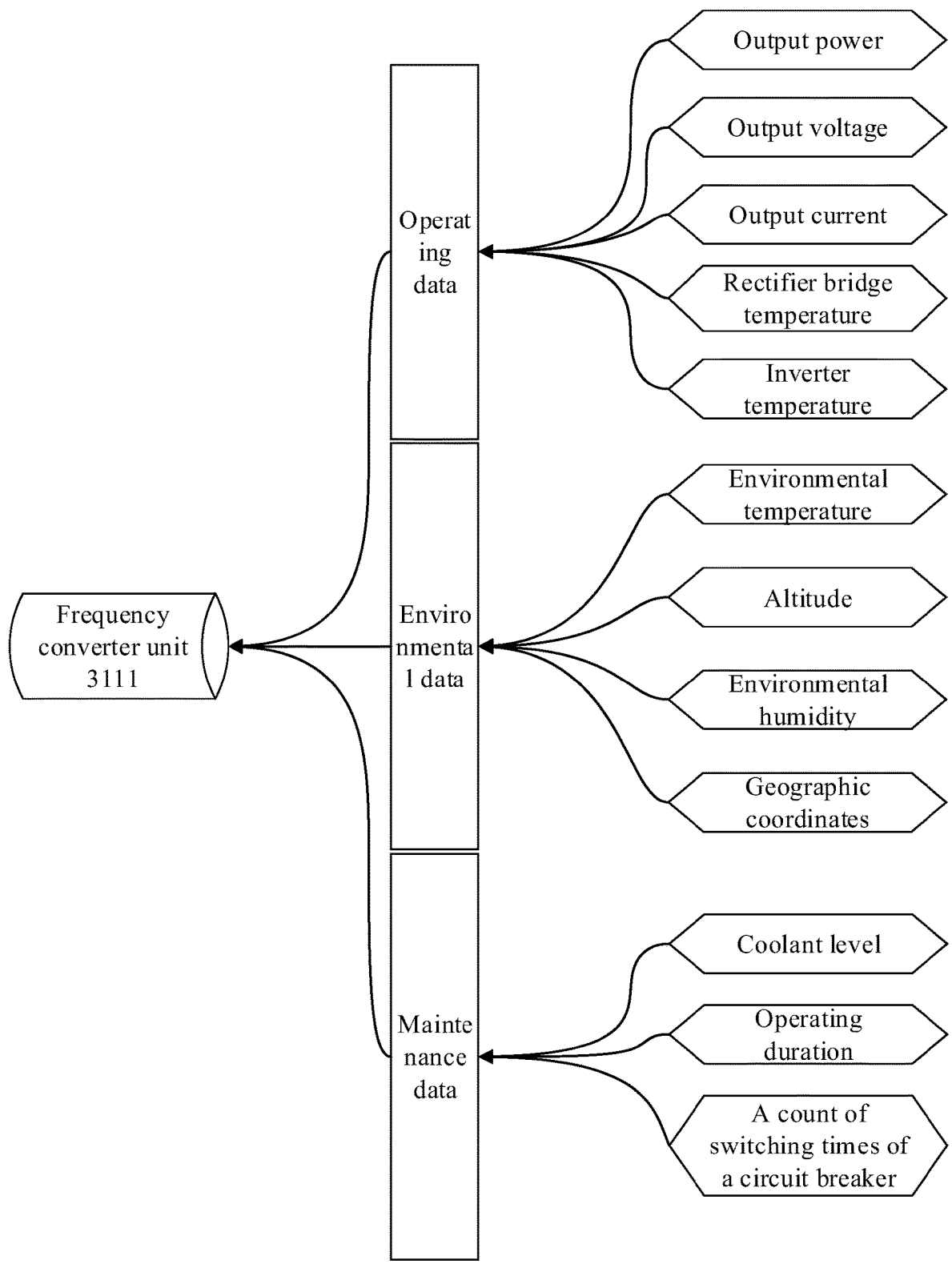
FIGS. 4 to 11 are schematic diagrams of operating data, environmental data, and maintenance data of various components provided by at least one embodiment of the present disclosure.

For example, as shown in FIG. 4, obtaining the operating parameters of the component to be tested in the at least one dimension includes: obtaining the operating parameters of the frequency converter unit 3111. For example, obtaining the operating parameters of the frequency converter unit 3111 comprises: obtaining an output power, an output voltage, an output current, a rectifier bridge temperature, and an inverter temperature of the frequency converter unit 3111 to obtain operating data of the frequency converter unit 3111; obtaining an environmental temperature, an environmental humidity, an altitude, and geographic coordinates of the frequency converter unit 3111 to obtain environmental data of the frequency converter unit 3111; obtaining a coolant level, an operating duration, and a count of switching times of a circuit breaker of the frequency converter unit 3111 to obtain maintenance data of the frequency converter unit 3111.

For example, as shown in FIG. 4, the control system collecting the operating data of the frequency converter unit 3111 includes obtaining the output power, the output voltage, the output current, the rectifier bridge temperature, the inverter temperature, and other parameters to establish a data model of the operating data (for example, formula (2)); the control system collecting the environmental data of the frequency converter unit 3111 includes obtaining information such as the environmental temperature, the environmental humidity, the altitude, the geographic coordinates, etc., to establish a data model of the environmental operating data (for example, formula (3)); the control system collecting the maintenance data of the frequency converter unit 3111 includes obtaining information such as the coolant level, the operating duration, and the number of switching times of the circuit breaker to establish a data model of the maintenance data (for example, formula (4)).

Figure 5:
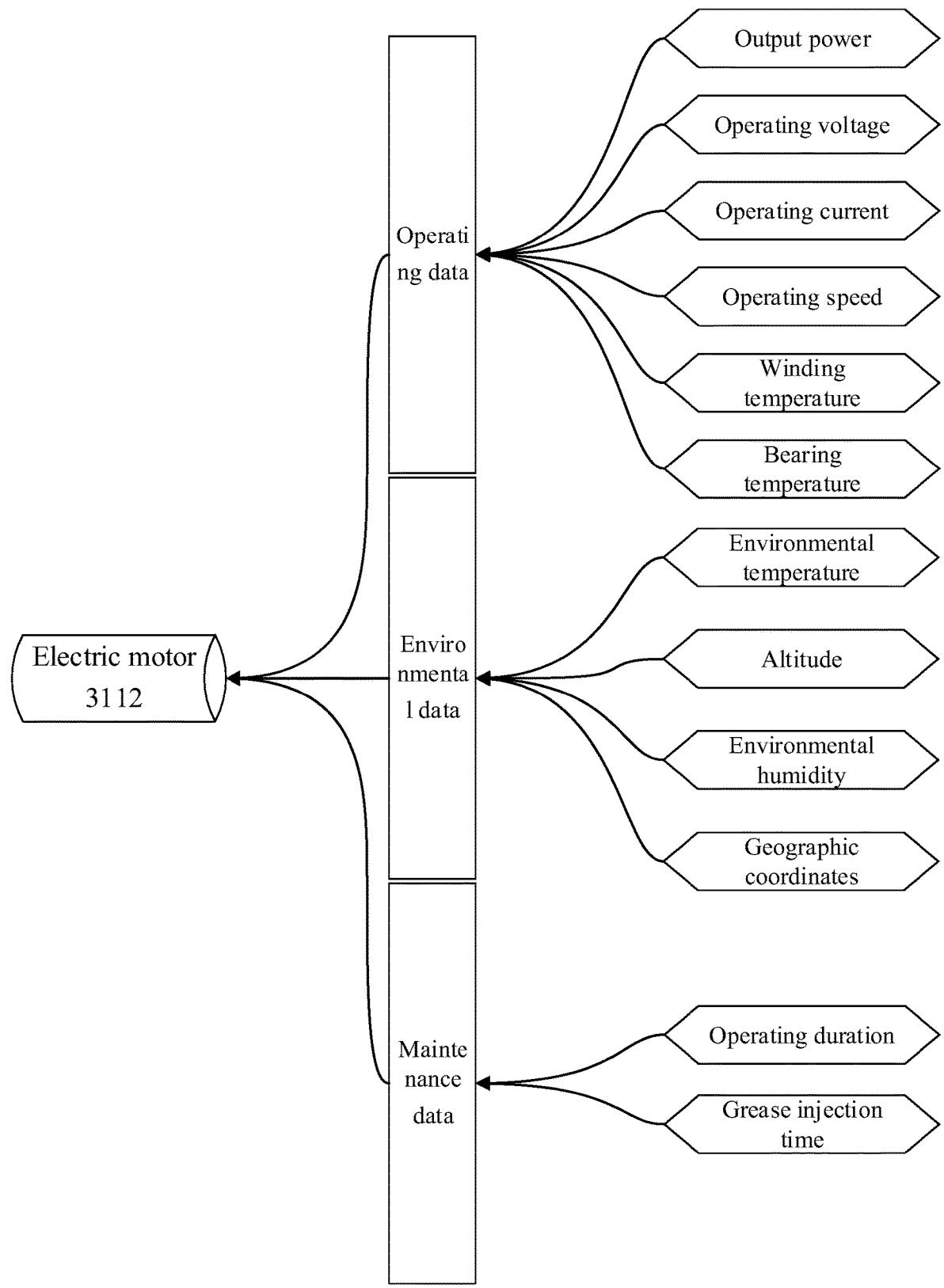

For example, as shown in FIG. 5, obtaining the operating parameters of the component to be tested in the at least one dimension includes: obtaining the operating parameters of the electric motor 3112. For example, obtaining the operating parameters of the electric motor 3112 comprises: obtaining an output power, an operating voltage, an operating current, an operating speed, a winding temperature, and a bearing temperature of the electric motor 3112 to obtain the operating data of the electric motor 3112; obtaining an environmental temperature, an environmental humidity, an altitude, and geographic coordinates of the electric motor 3112 to obtain the environmental data of the electric motor 3112; obtaining an operating duration and grease injection time of the electric motor 3112 to obtain the maintenance data of the electric motor 3112.

For example, as shown in FIG. 5, the control system collecting the operating data of the electric motor 3112 includes obtaining the output power, the operating voltage, the operating current, the operating speed, the winding temperature, the bearing temperature, and other parameters to establish a data model of the operating data (for example, formula (2)); the control system collecting the environmental data of the electric motor 3112 includes obtaining information such as the environmental temperature, the environmental humidity, the altitude, the geographic coordinates, etc., to establish a data model of the environmental operating data (for example, formula (3)); the control system collecting the maintenance data of the electric motor 3112 includes obtaining information such as the operating duration, the grease injection time, and other information to establish a data model of the maintenance data (for example, formula (4)).

Figure 6:
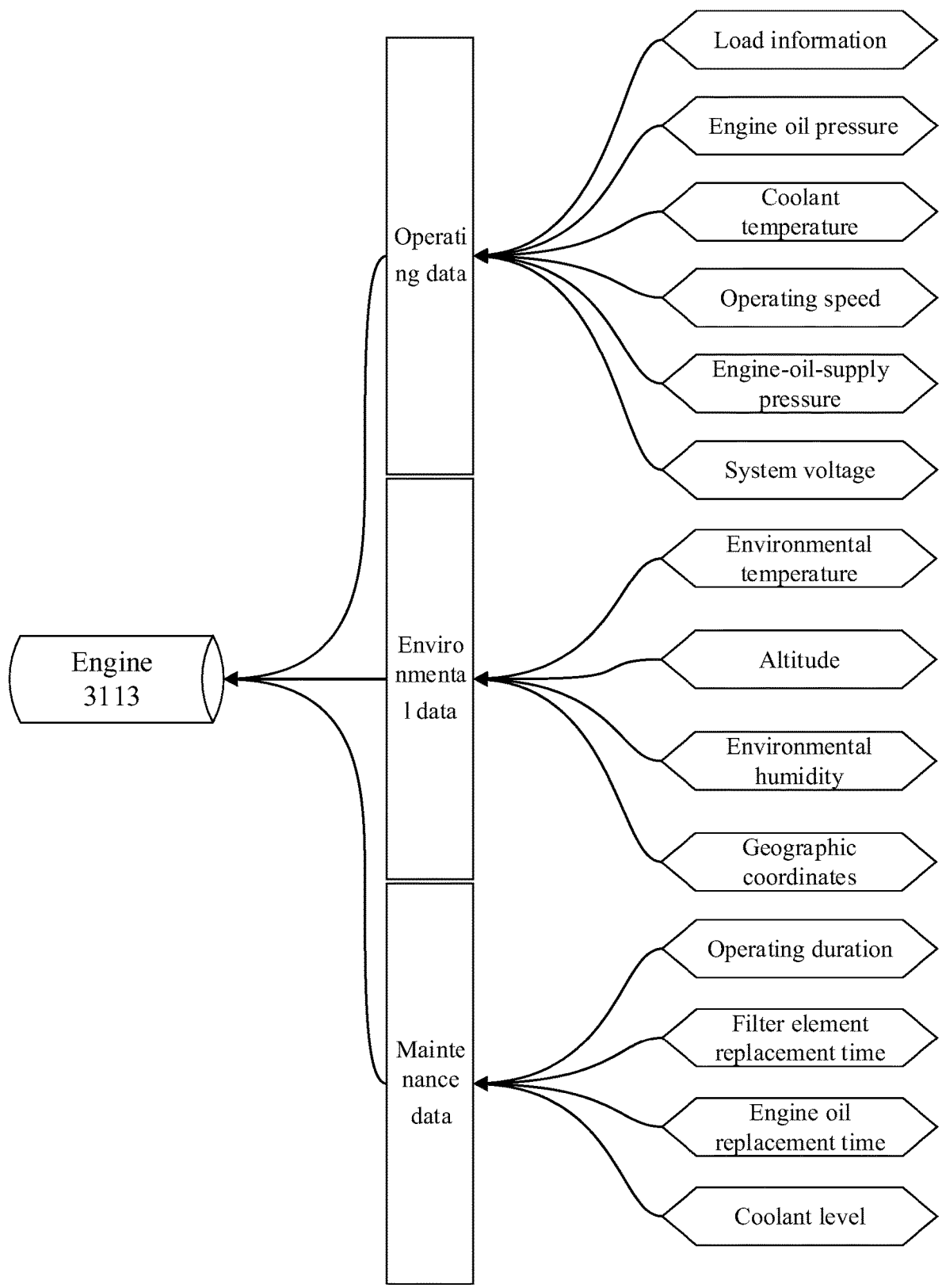

For example, as shown in FIG. 6, obtaining the operating parameters of the component to be tested in the at least one dimension includes: obtaining the operating parameters of the engine 3113. For example, obtaining the operating parameters of the engine 3113 comprises: obtaining load information, an engine oil pressure, a coolant temperature, an operating speed, an engine-oil-supply pressure, and a system voltage of the engine 3113 to obtain operating data of the engine 3113; obtaining an environmental temperature, an environmental humidity, an altitude, geographic coordinates of the engine 3113 to obtain environmental data of the engine 3113; and obtaining an operating duration, filter element replacement time, engine oil replacement time, and a coolant level of the engine 3113 to obtain maintenance data of the engine 3113.

For example, as shown in FIG. 6, the control system collecting the operating data of the engine 3113 includes obtaining the load information, the oil pressure, the coolant temperature, the operating speed, the engine-oil-supply pressure, the system voltage, and other parameters to establish a data model of the operating data (for example, formula (2)); the control system collecting the environmental data of the engine 3113 includes obtaining the environmental temperature, the environmental humidity, the altitude, the geographic coordinates, and other information to establish a data model of the environmental operating data (for example, formula (3)); the control system collecting the maintenance data of the engine 3113 includes obtaining the operating duration, the filter element replacement time, the engine oil replacement time, the coolant level, and other information to establish a data model of the maintenance data (for example, formula (4)).

Figure 7:
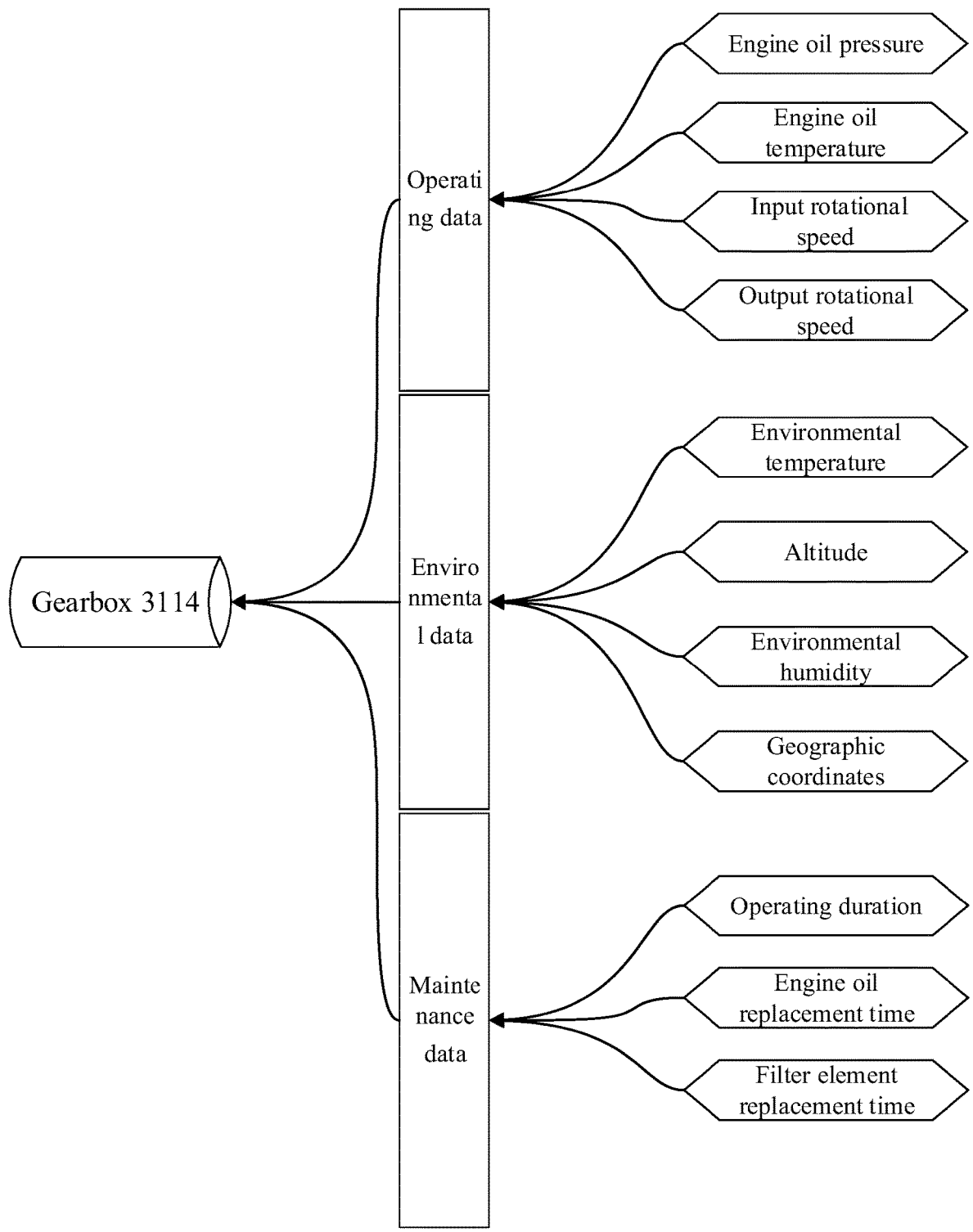

For example, as shown in FIG. 7, obtaining the operating parameters of the component to be tested in the at least one dimension includes: obtaining the operating parameters of the gearbox 3114. For example, obtaining the operating parameters of the gearbox 3114 comprises: obtaining an engine oil pressure, an engine oil temperature, an input rotational speed, and an output rotational speed of the gearbox 3114 to obtain the operating data of the gearbox 3114; obtaining an environmental temperature, an environmental humidity, an altitude, and geographic coordinates of the gearbox 3114 to obtain the environmental data of the gearbox 3114; obtaining an operating duration, filter element replacement time, and engine oil replacement time of the gearbox 3114 to obtain maintenance data of the gearbox 3114.

For example, as shown in FIG. 7, the control system collecting the operating data of the gearbox 3114 includes obtaining the engine oil pressure, the engine oil temperature, the input rotational speed, the output rotational speed, and other parameters to establish a data model of the operating data (for example, formula (2)); the control system collecting the environmental data of the gearbox 3114 includes obtaining information such as the environmental temperature, the environmental humidity, the altitude, the geographic coordinates, and other information to establish a data model of the environmental operating data (for example, formula (3)); the control system collecting the maintenance data of the gearbox 3114 includes obtaining information such as the operating duration, the filter element replacement time, the engine oil replacement time, and other information to establish a data model of the maintenance data (for example, formula (4)).

For example, the execution component 32 receives power from the power component 31, and converts the power into mechanical energy by means of mechanical or hydraulic transmission or the like. For example, the output shaft of the electric motor 3112 is connected to the plunger pump 3221 to drive the plunger pump 3221 to operate, or the output shaft of the hydraulic motor is connected to the centrifugal pump 3222 to drive the centrifugal pump 3222 to operate. The execution component 32 can be divided into two types: the plunger pump 3221 and the centrifugal pump 3222.

Figure 8:
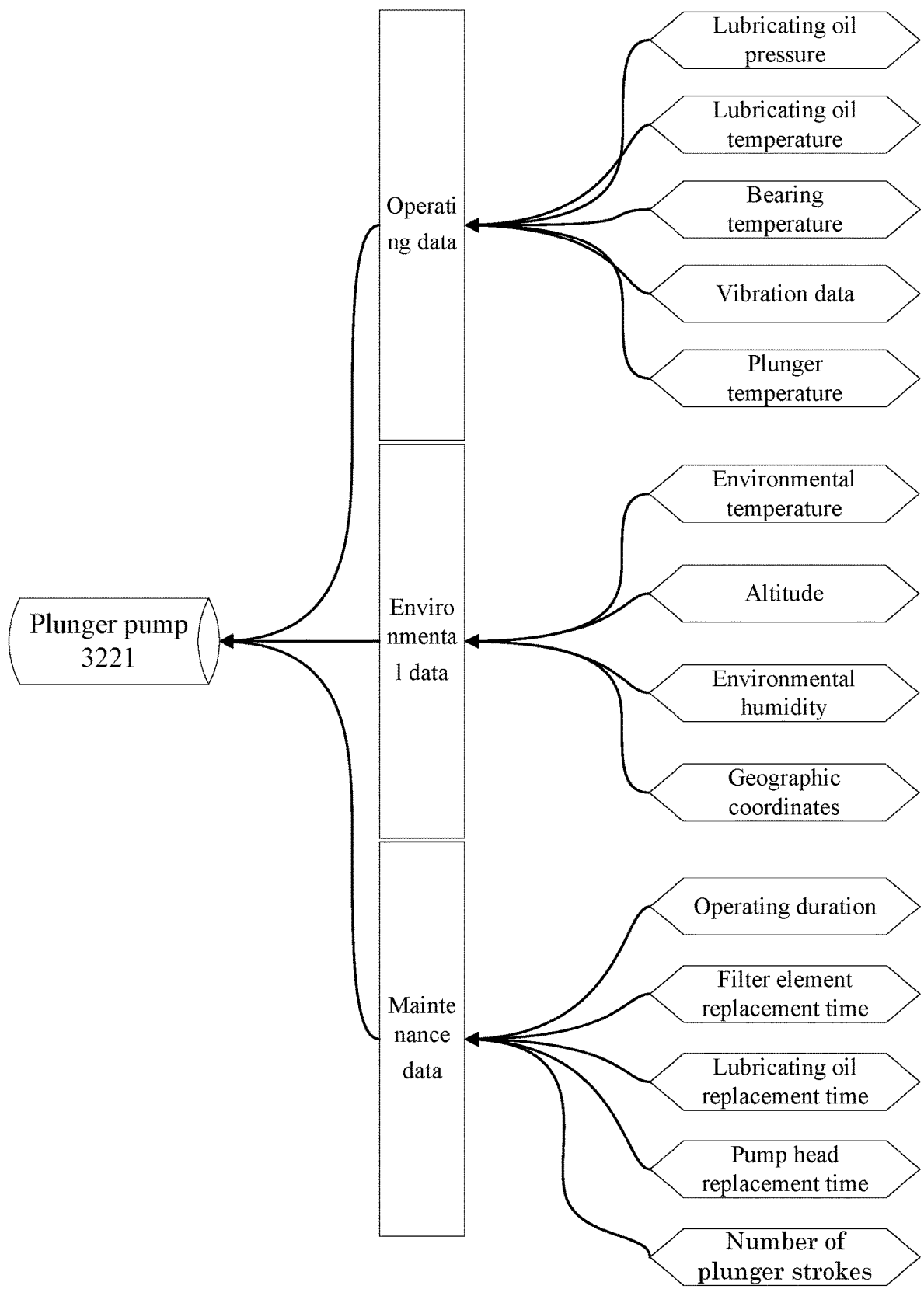

For example, as shown in FIG. 8, obtaining the operating parameters of the component to be tested in the at least one dimension includes: obtaining the operating parameters of the plunger pump 3221. For example, obtaining the operating parameters of the plunger pump 3221 comprises: obtaining a lubricating oil pressure, a lubricating oil temperature, a bearing temperature, vibration data, and a plunger temperature of the plunger pump 3221 to obtain operating data of the plunger pump 3221; obtaining an environmental temperature, an environmental humidity, an altitude, and geographic coordinates of the plunger pump 3221 to obtain environmental data of the plunger pump 3221; obtaining an operating duration, filter element replacement time, lubricating oil replacement time, pump head replacement time, and a count of plunger strokes of the plunger pump 3221 to obtain maintenance data of the plunger pump 3221.

For example, as shown in FIG. 8, the control system collecting the operating data of the plunger pump 3221 includes obtaining the lubricating oil pressure, the lubricating oil temperature, the bearing temperature, the vibration data, the plunger temperature, and other parameters to establish a data model of the operating data (for example, the formula (2)); the control system collecting the environmental data of the plunger pump 3221 includes obtaining information such as the environmental temperature, the environmental humidity, the altitude, the geographic coordinates, etc., to establish a data model of the environmental operating data (for example, formula (3)); the control system collecting the maintenance data of the plunger pump 3221 includes obtaining the operating duration, the filter element replacement time, the lubricating oil replacement time, the pump head replacement time, the number of the plunger strokes, and other information to establish a data model of the maintenance data (for example, formula (4)).

Figure 9:
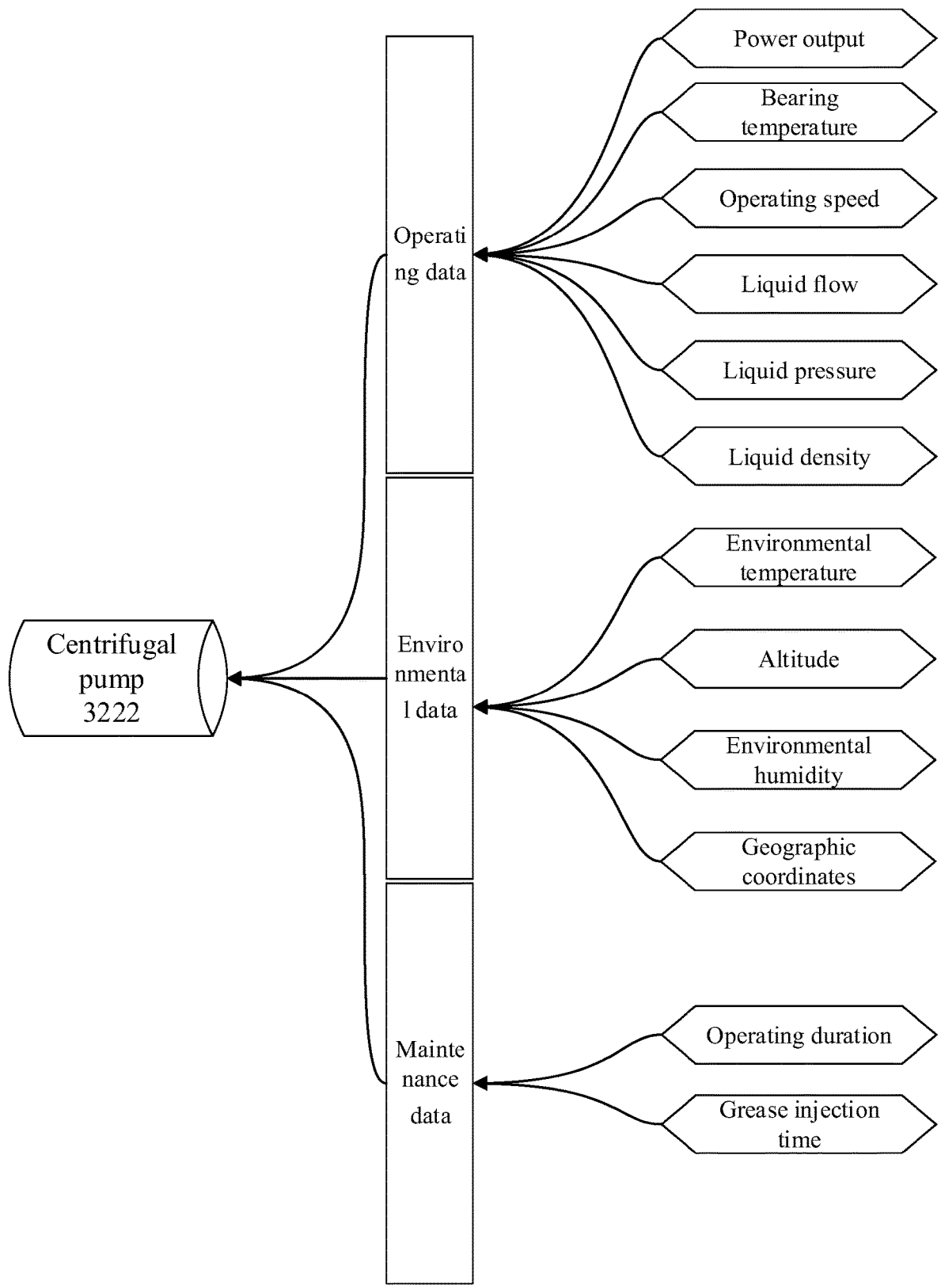

For example, as shown in FIG. 9, obtaining the operating parameters of the component to be tested in the at least one dimension includes: obtaining the operating parameters of the centrifugal pump 3222. For example, obtaining the operating parameters of the centrifugal pump 3222 comprises: obtaining a power output, a bearing temperature, an operating speed, a liquid flow, a liquid pressure, and a liquid density of the centrifugal pump 3222 to obtain operating data of the centrifugal pump 3222; obtaining an environmental temperature, an environmental humidity, an altitude, and geographic coordinates of the centrifugal pump 3222 to obtain environmental data of the centrifugal pump 3222; obtaining an operating duration and grease injection time of the centrifugal pump 3222 to obtain maintenance data of the centrifugal pump 3222.

For example, as shown in FIG. 9, the control system collecting the operating data of the centrifugal pump 3222 includes obtaining the power output, the bearing temperature, the operating speed, the liquid flow, the liquid pressure, the liquid density, and other parameters to establish a data model of the operating data (for example, the formula (2));

the control system collecting the environmental data of the centrifugal pump 3222 includes obtaining information such as the environmental temperature, the environmental humidity, the altitude, the geographic coordinates, etc. to establish a data model of the environmental operating data (for example, formula (3)); the control system collecting the maintenance data of the centrifugal pump 3222 includes obtaining information such as the operating duration, the grease injection time, etc. to establish a data model of the maintenance data (for example, formula (4)).

For example, the manifold component 33 is used to withstand the pressure of high-pressure fluid, and is used to switch and transmit high-pressure fluid. According to the functions of the high-pressure components, the manifold component 33 can be divided into the high-pressure valve 3331 and the high-pressure manifold 3332.

Figure 10:
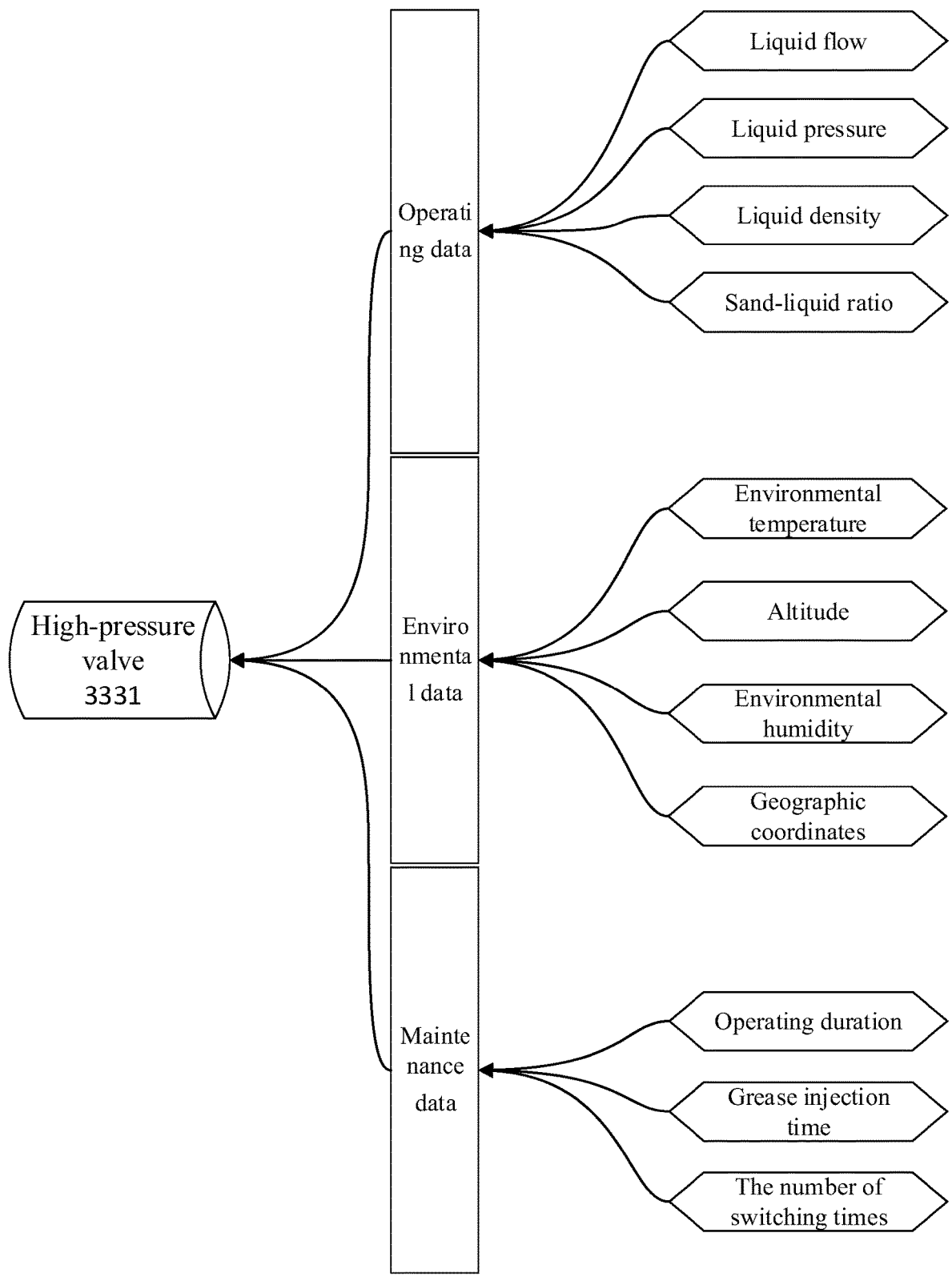

For example, as shown in FIG. 10, obtaining the operating parameters of the component to be tested in the at least one dimension includes: obtaining the operating parameters of the high-pressure valve 3331. For example, obtaining the operating parameters of the high-pressure valve 3331 comprises: obtaining a liquid flow, a liquid pressure, a liquid density, and a sand-liquid ratio of the high-pressure valve 3331 to obtain operating data of the high-pressure valve 3331; obtaining an environmental temperature, an environmental humidity, an altitude, and geographic coordinates of the high-pressure valve 3331 to obtain environmental data of the high-pressure valve 3331; obtaining an operating duration, grease injection time, and a count of switching times of the high-pressure valve 3331 to obtain maintenance data of the high-pressure valve 3331.

For example, as shown in FIG. 10, the control system collecting the operating data of the high-pressure valve 3331 includes obtaining parameters such as the liquid flow, the liquid pressure, the liquid density, and the sand-liquid ratio to establish a data model of the operating data (for example, formula (2)); the control system collecting the environmental data of the high-pressure valve 3331 includes obtaining information such as the environmental temperature, the environmental humidity, the altitude, the geographic coordinates, etc. to establish a data model of the environmental operating data (for example, formula (3)); the control system collecting the maintenance data of the high-pressure valve 3331 includes obtaining information such as the operating duration, the grease injection time, and the number of switching times to establish a data model of the maintenance data (for example, formula (4)).

Figure 11:
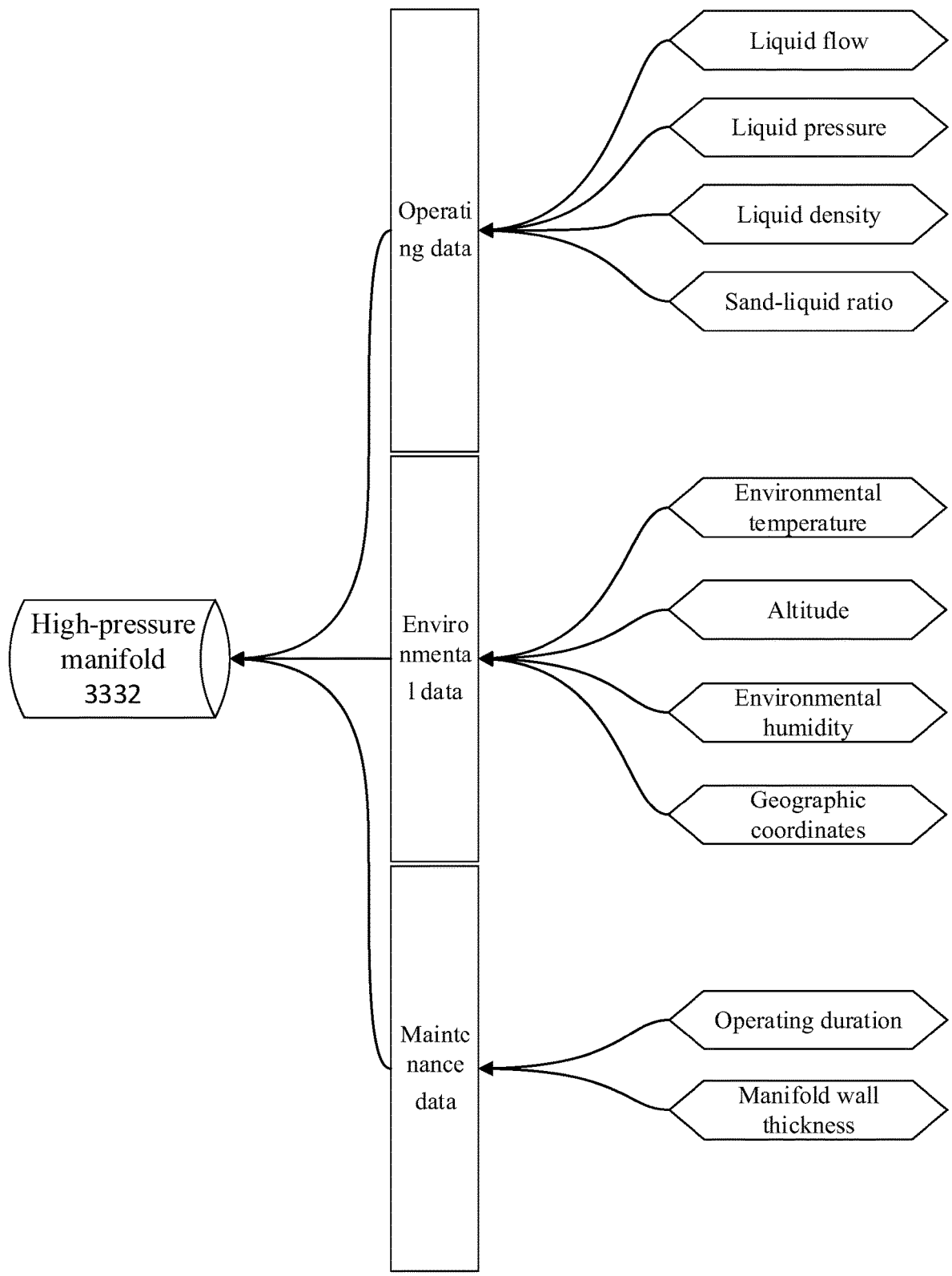

For example, as shown in FIG. 11, obtaining the operating parameters of the component to be tested in the at least one dimension includes: obtaining the operating parameters of the high-pressure manifold 3332. For example, obtaining the operating parameters of the high-pressure manifold 3332 comprises: obtaining a liquid flow, a liquid pressure, a liquid density, and a sand-liquid ratio of the high-pressure manifold 3332 to obtain operating data of the high-pressure manifold 3332; obtaining an environmental temperature, an environmental humidity, an altitude, and geographic coordinates of the high-pressure manifold 3332 to obtain environmental data of the high-pressure manifold 3332; obtaining an operating duration and a manifold wall thickness of the high-pressure manifold 3332 to obtain maintenance data of the high-pressure manifold 3332.

For example, as shown in FIG. 11, the control system collecting the operating data of the high-pressure manifold 3332 includes collecting parameters such as the liquid flow, the liquid pressure, the liquid density, and the sand-liquid ratio to establish a data model of the operating data (for example, formula (2)); the control system collecting the environmental data of the high-pressure manifold includes collecting the environmental temperature, the environmental humidity, the altitude, the geographic coordinates, and other information to establish a data model of the environmental operating data (for example, formula (3)); the control system collecting the maintenance data of the high-pressure manifold includes obtaining information such as the operating duration and the manifold wall thickness to establish a data model of the maintenance data (for example, formula (4)).

It should be noted that, in the embodiments of the present disclosure, the flow of the evaluation method provided by the above various embodiments of the present disclosure may include more or fewer operations, and these operations may be performed sequentially or in parallel. Although the flow of the evaluation method described above includes a plurality of operations appearing in a specific order, it should be clearly understood that the order of the plurality of operations is not limited. The above-described evaluation method can be executed once or several times according to a predetermined condition.

The evaluation method for evaluating the health state of the well site equipment provided by the embodiments of the present disclosure can monitor the operating parameters of important components in real time, evaluate the health states of the components based on the operating parameters, and generate the evaluation values of the health states of the components in real time, the operator can monitor the health state of the equipment according to the evaluation values of the health states of the components, so that the equipment with a low health state can be maintained and overhauled in time, thereby reducing the abnormal downtime of the equipment, ensuring the normal operation of the equipment, and improving production efficiency.

Figure 12:
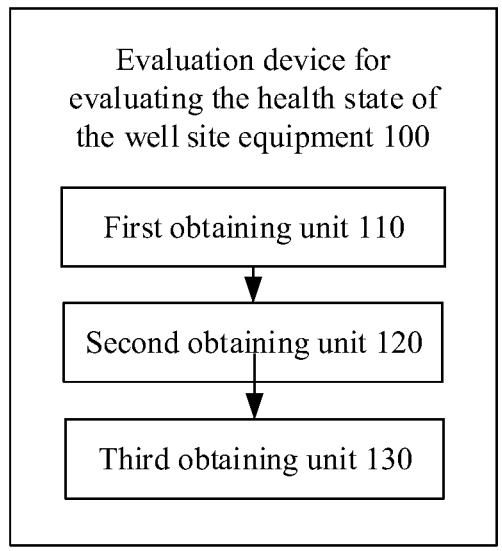
FIG. 12 is a schematic diagram of an evaluation device for evaluating a health state of well site equipment provided by at least one embodiment of the present disclosure.

FIG. 12 is a schematic block diagram of an evaluation device for evaluating a health state of well site equipment provided by at least one embodiment of the present disclosure. For example, in the example shown in FIG. 12, the evaluation device 100 for evaluating the health state of the well site equipment includes a first obtaining unit 110, a second obtaining unit 120, and a third obtaining unit 130. For example, these units may be implemented by hardware (for example, circuit) modules or software modules, etc. The following embodiments are the same as this, and will not be repeated. For example, these units can be implemented by a central processing unit (CPU), a graphics processing unit (GPU), a tensor processor (TPU), a field programmable logic gate array (FPGA), or other forms of processing units having data processing capabilities and/or instruction execution capabilities and corresponding computer instructions.

The first obtaining unit 100 is configured to obtain operating parameters of a component to be tested of equipment to be tested in at least one dimension. For example, the at least one dimension comprises an operating data dimension, an environmental data dimension, and a maintenance data dimension. For example, the first obtaining unit 110 may implement the step S110, for the specific implementation method of the first obtaining unit 110, reference may be made to the related description of the step S110, which will not be repeated here.

The second obtaining unit 120 is configured to obtain evaluation values of a health state of the component to be tested in various dimensions based on the operating parameters. For example, an operating parameter of the operating data dimension comprises operating data, an operating parameter of the environmental data dimension comprises environmental data, and an operating parameter of the maintenance data dimension comprises maintenance data. For example, the second obtaining unit 120 can implement the step S120, for the specific implementation method of the second obtaining unit 120, reference may be made to the related description of the step S120, which will not be repeated here.

The third obtaining unit 130 is configured to obtain a comprehensive evaluation value of the health state of the component to be tested based on the evaluation values of the health state of the component to be tested in the various dimensions. For example, the third obtaining unit 130 can implement the step S130, for the specific implementation method of the third obtaining unit 130, reference may be made to the related description of the step S130, which will not be repeated here.

It should be noted that in the embodiments of the present disclosure, the evaluation device 100 may include more or fewer circuits or units, and the connection relationship among the various circuits or units is not limited and can be determined according to actual requirements. The specific structure of each circuit is not limited, and may be composed of analog devices according to the circuit principle, or may be composed of digital chips, or be composed in other suitable manners.

Figure 13:
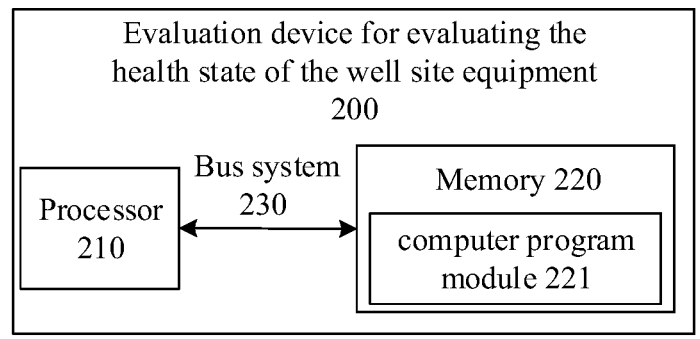
FIG. 13 is a schematic diagram of another evaluation device for evaluating a health state of well site equipment provided by at least one embodiment of the present disclosure.

FIG. 13 is a schematic diagram of another evaluation device for evaluating a health state of well site equipment provided by at least one embodiment of the present disclosure. For example, as shown in FIG. 13, the evaluation device 200 for evaluating the health state of the well site equipment includes a processor 210, a memory 220, and one or more computer program modules 221.

For example, the processor 210 and the memory 220 are connected through a bus system 230. For example, the one or more computer program modules 221 are stored in the memory 220. For example, the one or more computer program modules 221 include instructions for executing the evaluation method for evaluating the health state of the well site equipment provided by any embodiment of the present disclosure. For example, the instructions in the one or more computer program modules 221 may be executed by the processor 210. For example, the bus system 230 may be a commonly used serial or parallel communication bus, etc., the embodiments of the present disclosure do not limit this.

For example, the processor 210 may be a central processing unit (CPU), a digital signal processor (DSP), a graphics processing unit (GPU), or other forms of processing units with data processing capabilities and/or instruction execution capabilities, and may be a general-purpose processor or a dedicated processor, and can control other components in the evaluation device 200 for evaluating the health state of the well site equipment to perform desired functions.

The memory 220 may include one or more computer program products, and the computer program products may include comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, a flash memory, and the like. One or more computer program instructions may be stored on the computer-readable storage medium, and the processor 210 may execute the program instructions to implement the functions (implemented by the processor 210) in the embodiments of the present disclosure and/or other desired functions, such as the evaluation method for evaluating the health state of the well site equipment, and the like. The computer-readable storage medium can also store various application programs and various data, such as the operating data, the environmental data, the maintenance data, the evaluation values of various dimensions, the comprehensive evaluation value, and various data used and/or generated by the applications.

It should be noted that, for the sake of clarity and conciseness, the embodiment of the present disclosure does not provide all the components of the evaluation device 200 for evaluating the health state of the well site equipment. In order to achieve the necessary functions of the evaluation device 200 for evaluating the health state of the well site equipment, those skilled in the art can provide and set other not shown component units according to specific needs, and the embodiments of the present disclosure do not limit this.

Regarding the technical effects of the evaluation device 100 for evaluating the health state of the well site equipment and the evaluation device 200 for evaluating the health state of the well site equipment in different embodiments, reference may be made to the technical effects of the evaluation method provided in the embodiments of the present disclosure, and similar portions will not be repeated here.

Figure 14:
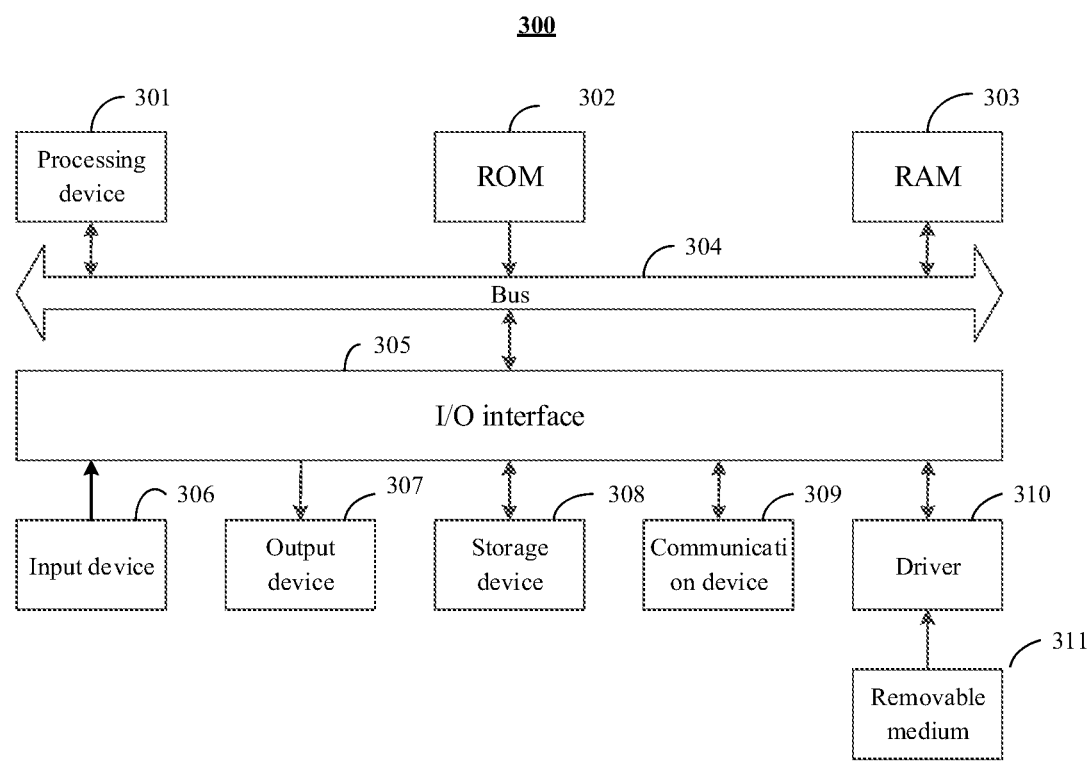
FIG. 14 is a schematic diagram of electronic equipment provided by at least one embodiment of the present disclosure.

The evaluation device 100 for evaluating the health state of the well site equipment and the evaluation device 200 for evaluating the health state of the well site equipment may be used in various appropriate electronic equipment. FIG. 14 is a schematic diagram of electronic equipment provided by at least one embodiment of the present disclosure. For example, the electronic equipment is terminal equipment, which is not limited in the embodiments of the present disclosure.

For example, as shown in FIG. 14, in some examples, the electronic equipment 300 includes a processing device (such as a central processing unit, a graphics processing unit, etc.) 301, which can perform various appropriate actions and processing according to a program stored in a read only memory (ROM) 302 or a program loaded from the storage device 308 into a random access memory (RAM) 303. In the RAM 303, various programs and data required for the operation of the computer system are also stored. The processing device 301, the ROM 302, and the RAM 303 are connected via the bus 304. An input/output (I/O) interface 305 is also connected to the bus 304.

For example, the following components can be connected to the I/O interface 305: an input device 306 including such as a touch screen, a touch pad, a keyboard, a mouse, a camera, a microphone, a accelerometer, a gyroscope, etc.; an output device 307 including such as a liquid crystal display (LCD), a speaker, a vibrator, etc., for example, for displaying the comprehensive evaluation value of the component, etc.; a storage device 308 including, for example, a magnetic tape, a hard disk, etc.; and a communication device 309 including a network interface card such as a LAN card, a modem, and the like. The communication device 309 may allow the electronic equipment 300 to perform wireless or wired communication with other devices to exchange data, and perform communication processing via a network such as the Internet. The driver 310 is also connected to the I/O interface 305 as needed. A removable medium 311, such as a magnetic disk, an optical disk, a magneto-optical disk, a semiconductor memory, etc., is installed on the driver 310 as needed, so that the computer program read from the removable medium 311 can be installed into the storage device 309 as needed. Although FIG. 7 shows the electronic equipment 300 including various devices, it should be understood that it is not required to implement or include all of the illustrated devices. More or fewer devices may be implemented alternatively or included.

For example, the electronic equipment 300 may further include a peripheral interface (not shown in the figure) and the like. The peripheral interface can be various types of interfaces, such as a USB interface, a lightning interface, and the like. The communication device 309 can communicate with a network and other devices through wireless communication, the network is, for example, the Internet, an intranet, and/or a wireless network such as a cellular telephone network, a wireless local area network (LAN), and/or a metropolitan area network (MAN). The wireless communication can use any of a variety of communication standards, protocols, and technologies, including but not limited to Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (for example based on IEEE 802.11a, IEEE 802.11b, IEEE 802.11g, and/or IEEE 802.11n standards), Voice over Internet Protocol (VoIP), Wi-MAX, protocols used for e-mail, instant messaging, and/or short message service (SMS), or any other suitable communication protocols.

For example, the electronic equipment can be any equipment such as a mobile phone, a tablet computer, a notebook computer, an e-book, a game console, a television, a digital photo frame, a navigator, etc., or can be any combination of electronic equipment and hardware, and the embodiments of the present disclosure do not limit this.

For example, according to an embodiment of the present disclosure, the process described above with reference to the flowchart may be implemented as a computer software program. For example, an embodiment of the present disclosure includes a computer program product, which includes a computer program carried on a non-transitory computer readable medium, and the computer program contains program codes for executing the method shown in the flowchart. In such an embodiment, the computer program may be downloaded and installed from the network through the communication device 309, or installed from the storage device 308, or installed from the ROM 302. When the computer program is executed by the processing device 301, the function of the above-mentioned evaluation method for evaluating the health state of the well site equipment defined in the method of the embodiment of the present disclosure is executed.

It should be noted that the aforementioned computer-readable medium in the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, device, or component, or a combination of any of the above. More specific examples of the computer-readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the embodiments of the present disclosure, the computer-readable storage medium may be any tangible medium that contains or stores a program, and the program may be used by or in combination with an instruction execution system, device, or component. However, in the embodiments of the present disclosure, the computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the above-mentioned signals. The computer-readable signal medium may also be any computer-readable medium other than the computer-readable storage medium. The computer-readable signal medium may send, propagate, or transmit the program for use by or in combination with the instruction execution system, device, or component. The program codes contained on the computer-readable medium can be transmitted by any suitable medium, including but not limited to: wire, optical cable, RF (radio frequency), etc., or any suitable combination of the above.

In some implementations, the client and the server can communicate with any currently known or future-developed network protocol such as HTTP (HyperText Transfer Protocol), and can be interconnected with any form or medium of digital data communication (for example, a communication network). Examples of the communication network include local area network ("LAN"), wide area network ("WAN"), the Internet (for example, the Internet), and end-to-end network (for example, ad hoc end-to-end networks), and any currently known network or network researched and developed in the future.

The above-mentioned computer-readable medium may be included in the above-mentioned electronic equipment; or may also exist alone without being assembled into the electronic equipment.

The aforementioned computer-readable medium carries one or more programs, and when the aforementioned one or more programs are executed by the electronic equipment, the electronic device is caused to: obtain at least two Internet Protocol addresses; send a node evaluation request including the at least two Internet Protocol addresses to a node evaluation device, and the node evaluation device selecting an Internet Protocol address from the at least two Internet Protocol addresses and returns; and receive the Internet Protocol address returned by the node evaluation device. The obtained Internet Protocol address indicates an edge node in the content distribution network.

Alternatively, the aforementioned computer-readable medium carries one or more programs, and when the aforementioned one or more programs are executed by the electronic equipment, the electronic equipment is caused to: receive a node evaluation request including at least two Internet Protocol addresses; select an Internet Protocol address from the at least two Internet Protocol addresses; and return the selected Internet Protocol address. The received Internet Protocol address indicates an edge node in the content distribution network.

The computer program code used to perform the operations of the present disclosure can be written in one or more programming languages or a combination thereof. The above-mentioned programming languages include but are not limited to object-oriented programming languages such as Java, Smalltalk, C++, and also include conventional procedural programming languages-such as "C" language or similar programming languages. The program code can be executed completely on the user's computer, partly on the user's computer, executed as an independent software package, partly executed on the user's computer and partly executed on a remote computer, or completely executed on the remote computer or server. In the case of a remote computer, the remote computer can be connected to the user's computer through any kind of network, including a local area network (LAN) or a wide area network (WAN), or can be connected to an external computer (for example, using an Internet service provider to connect via the Internet).

The functions described above may be performed at least in part by one or more hardware logic components. For example, without limitation, exemplary types of the hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In various embodiments of the present disclosure, a machine-readable medium may be a tangible medium, which may contain or store a program for use by the instruction execution system, device, or equipment or use in combination with the instruction execution system, device, or equipment. The machine-readable medium may be a machine-readable signal medium or a machine-readable storage medium. The machine-readable medium may include, but is not limited to, an electronic, magnetic, optical, electromagnetic, infrared, or semiconductor system, device, or equipment, or any suitable combination of the foregoing. More specific examples of the machine-readable storage medium can include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

Figure 15:
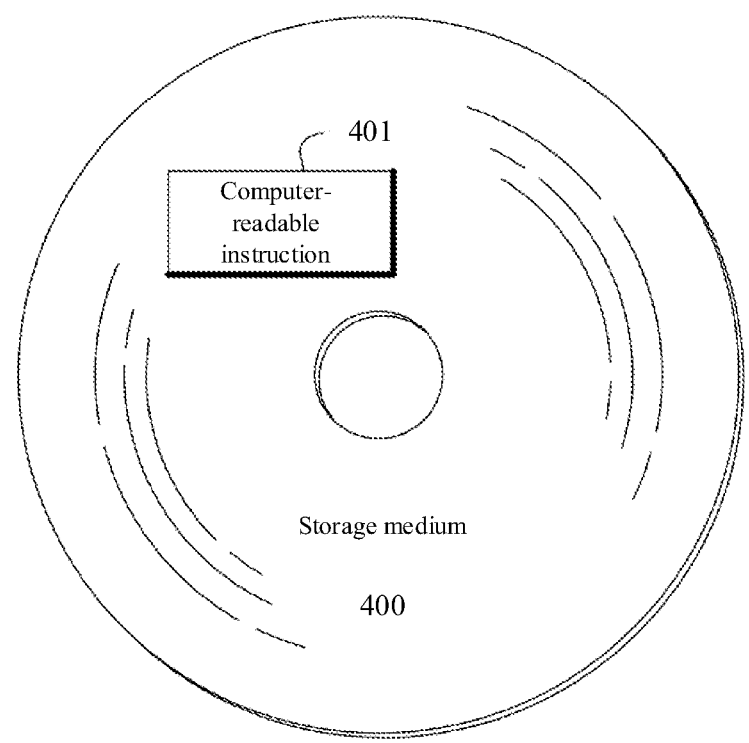
FIG. 15 is a schematic diagram of a storage medium provided by at least one embodiment of the present disclosure.

At least one embodiment of the present disclosure also provides a storage medium. FIG. 15 is a schematic diagram of a storage medium provided by at least one embodiment of the present disclosure. For example, as shown in FIG. 15, the storage medium 400 non-temporarily stores computer-readable instructions 401, and when the non-transitory computer-readable instructions are executed by a computer (including a processor), the evaluation method for evaluating the health state of the well site equipment provided by any embodiment of the present disclosure can be implemented.

For example, the storage medium may be any combination of one or more computer-readable storage media. For example, a computer-readable storage medium contains computer-readable program codes for obtaining operating parameters of a component to be tested of equipment to be tested in at least one dimension, another computer-readable storage medium contains computer-readable program codes for obtaining evaluation values of a health state of the component to be tested in various dimensions based on the operating parameters of the various dimensions, and another computer-readable storage medium contains computer-readable program code for obtaining a comprehensive evaluation value of the health state of the component to be tested based on the evaluation values of the health state of the component to be tested in the various dimensions. For example, when the program code is read by a computer, the computer can execute the program code stored in the computer storage medium, and execute, for example, the evaluation method for evaluating the health state of the well site equipment provided by any embodiment of the present disclosure.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disk read-only memory (CD-ROM), a flash memory, or any combination of the foregoing storage media, may also be other suitable storage media.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. An evaluation method for evaluating a health state of well site equipment, comprising:
   obtaining operating parameters of a component to be tested of equipment to be tested in real time while the equipment to be tested is operated in at least one dimension, wherein the at least one dimension comprises an operating data dimension, an environmental data dimension, and a maintenance data dimension;
   obtaining evaluation values of a health state of the component to be tested in various dimensions based on the operating parameters of the various dimensions, wherein an operating parameter of the operating data dimension comprises operating data, an operating parameter of the environmental data dimension comprises environmental data, and an operating parameter of the maintenance data dimension comprises maintenance data; and
   obtaining a comprehensive evaluation value of the health state of the component to be tested based on the evaluation values of the health state of the component to be tested in the various dimensions, wherein:
   the component to be tested comprises a power component, an execution component, and a manifold component;
   the power component comprises a frequency converter unit, an electric motor, an engine, and a gearbox, which are driven by electricity;
   the execution component comprises a plunger pump and a centrifugal pump; and
   the manifold component comprises a high-pressure valve and a high-pressure manifold in a well site.

2. The evaluation method according to claim 1, further comprising:
   according to the comprehensive evaluation value of the health state of the component to be tested, performing a fault prediction on the component to be tested and implementing corresponding maintenance measures.

3. The evaluation method according to claim 1, wherein the equipment to be tested comprises at least one component to be tested, and the evaluation method further comprises:
   according to the comprehensive evaluation value of the at least one component to be tested, obtaining a comprehensive evaluation value of the equipment to be tested, and monitoring a health state of the equipment to be tested according to the comprehensive evaluation value of the equipment to be tested.

4. The evaluation method according to claim 1, wherein a calculation formula for an evaluation value of the health state of the component to be tested in any one of the operating data dimension, the environmental data dimension, and the maintenance data dimension is:

$$P = \sum_{t=0}^{T} K_t P_t, \text{ and } \sum_{t=0}^{T} K_t = 1, \qquad \text{formula (1)}$$

where Kt is a weight coefficient of a t-th operating parameter, Pt is a scoring coefficient of the t-th operating parameter, t is an integer greater than or equal to 0 and less than or equal to T, and T is a count of the operating parameters and is an integer greater than or equal to 1.

5. The evaluation method according to claim 4, wherein a calculation formula of the comprehensive evaluation value of the health state of the component to be tested is:

$$H=(R*W_R+U*W_U+M*W_M)*C_R*C_U*C_M, \qquad \text{formula (5)}$$

wherein H is the comprehensive evaluation value of the health state of the component to be tested,
- R is an evaluation value of the health state of the component to be tested in the operating data dimension and is obtained according to the formula (1),
- U is an evaluation value of the health state of the component to be tested in the environmental data dimension and is obtained according to the formula (1),
- M is an evaluation value of the health state of the component to be tested in the maintenance data dimension and is obtained according to the formula (1),
- $W_R$ is a weight coefficient of the operating data dimension,
- $W_U$ is a weight coefficient of the environmental data dimension, and
- $W_M$ is a weight coefficient of the maintenance data dimension,
- wherein $W_R+W_U+W_M=1$,
- $C_R$ is a fault coefficient of the operating data dimension,
- $C_U$ is a fault coefficient of the environmental data dimension,
- $C_M$ is a fault coefficient of the maintenance data dimension, and
- values of $C_R$, $C_U$, and $C_W$ are 0 or 1.

6. The evaluation method according to claim 1, wherein obtaining the operating parameters of the component to be tested in the at least one dimension, comprises: obtaining operating parameters of the frequency converter unit,
  wherein obtaining the operating parameters of the frequency converter unit comprises:
  obtaining an output power, an output voltage, an output current, a rectifier bridge temperature, and an inverter temperature of the frequency converter unit to obtain operating data of the frequency converter unit;
  obtaining an environmental temperature, an environmental humidity, an altitude, and geographic coordinates of the frequency converter unit to obtain environmental data of the frequency converter unit; and
  obtaining a coolant level, an operating duration, and a count of switching times of a circuit breaker of the frequency converter unit to obtain maintenance data of the frequency converter unit.

7. The evaluation method according to claim 1, wherein obtaining the operating parameters of the component to be tested in the at least one dimension, comprises: obtaining operating parameters of the electric motor,
  wherein obtaining the operating parameters of the electric motor comprises:
  obtaining an output power, an operating voltage, an operating current, an operating speed, a winding temperature, and a bearing temperature of the electric motor to obtain operating data of the electric motor;
  obtaining an environmental temperature, an environmental humidity, an altitude, and geographic coordinates of the electric motor to obtain environmental data of the electric motor; and
  obtaining an operating duration and grease injection time of the electric motor to obtain maintenance data of the electric motor.

8. The evaluation method according to claim 1, wherein obtaining the operating parameters of the component to be tested in the at least one dimension, comprises: obtaining operating parameters of the engine,
  wherein obtaining the operating parameters of the engine comprises:
  obtaining load information, an engine oil pressure, a coolant temperature, an operating speed, an engine-oil-supply pressure, and a system voltage of the engine to obtain operating data of the engine;
  obtaining an environmental temperature, an environmental humidity, an altitude, geographic coordinates of the engine to obtain environmental data of the engine; and
  obtaining an operating duration, filter element replacement time, engine oil replacement time, and a coolant level of the engine to obtain maintenance data of the engine.

9. The evaluation method according to claim 1, wherein obtaining the operating parameters of the component to be tested in the at least one dimension, comprises: obtaining operating parameters of the gearbox,
  wherein obtaining the operating parameters of the gearbox comprises:
  obtaining an engine oil pressure, an engine oil temperature, an input rotational speed, and an output rotational speed of the gearbox to obtain operating data of the gearbox;
  obtaining an environmental temperature, an environmental humidity, an altitude, and geographic coordinates of the gearbox to obtain environmental data of the gearbox; and
  obtaining an operating duration, filter element replacement time, and engine oil replacement time of the gearbox to obtain maintenance data of the gearbox.

10. The evaluation method according to claim 1, wherein obtaining the operating parameters of the component to be tested in the at least one dimension, comprises: obtaining operating parameters of the plunger pump,
  wherein obtaining the operating parameters of the plunger pump comprises:
  obtaining a lubricating oil pressure, a lubricating oil temperature, a bearing temperature, vibration data, and a plunger temperature of the plunger pump to obtain operating data of the plunger pump;
  obtaining an environmental temperature, an environmental humidity, an altitude, and geographic coordinates of the plunger pump to obtain environmental data of the plunger pump; and
  obtaining an operating duration, filter element replacement time, lubricating oil replacement time, pump head replacement time, and a count of plunger strokes of the plunger pump to obtain maintenance data of the plunger pump.

11. The evaluation method according to claim 1, wherein obtaining the operating parameters of the component to be tested in the at least one dimension, comprises: obtaining operating parameters of the centrifugal pump,
wherein obtaining the operating parameters of the centrifugal pump comprises:
obtaining a power output, a bearing temperature, an operating speed, a liquid flow, a liquid pressure, and a liquid density of the centrifugal pump to obtain operating data of the centrifugal pump;
obtaining an environmental temperature, an environmental humidity, an altitude, and geographic coordinates of the centrifugal pump to obtain environmental data of the centrifugal pump; and
obtaining an operating duration and grease injection time of the centrifugal pump to obtain maintenance data of the centrifugal pump.

12. The evaluation method according to claim 1, wherein obtaining the operating parameters of the component to be tested in the at least one dimension, comprises: obtaining operating parameters of the high-pressure valve,
wherein obtaining the operating parameters of the high-pressure valve comprises:
obtaining a liquid flow, a liquid pressure, a liquid density, and a sand-liquid ratio of the high-pressure valve to obtain operating data of the high-pressure valve;
obtaining an environmental temperature, an environmental humidity, an altitude, and geographic coordinates of the high-pressure valve to obtain environmental data of the high-pressure valve; and
obtaining an operating duration, grease injection time, and a count of switching times of the high-pressure valve to obtain maintenance data of the high-pressure valve.

13. The evaluation method according to claim 1, wherein obtaining the operating parameters of the component to be tested in the at least one dimension, comprises: obtaining operating parameters of the high-pressure manifold,
wherein obtaining the operating parameters of the high-pressure manifold comprises:
obtaining a liquid flow, a liquid pressure, a liquid density, and a sand-liquid ratio of the high-pressure manifold to obtain operating data of the high-pressure manifold;
obtaining an environmental temperature, an environmental humidity, an altitude, and geographic coordinates of the high-pressure manifold to obtain environmental data of the high-pressure manifold; and
obtaining an operating duration and a manifold wall thickness of the high-pressure manifold to obtain maintenance data of the high-pressure manifold.

14. An evaluation device for evaluating a health state of well site equipment, comprising:
a first obtaining unit, configured to obtain operating parameters of a component to be tested of equipment to be tested in real time while the equipment to be tested is operated in at least one dimension, wherein the at least one dimension comprises an operating data dimension, an environmental data dimension, and a maintenance data dimension;
a second obtaining unit, configured to obtain evaluation values of a health state of the component to be tested in various dimensions based on the operating parameters, wherein an operating parameter of the operating data dimension comprises operating data, an operating parameter of the environmental data dimension comprises environmental data, and an operating parameter of the maintenance data dimension comprises maintenance data;
a third obtaining unit, configured to obtain a comprehensive evaluation value of the health state of the component to be tested based on the evaluation values of the health state of the component to be tested in the various dimensions, wherein:
the component to be tested comprises a power component, an execution component, and a manifold component;
the power component comprises a frequency converter unit, an electric motor, an engine, and a gearbox, which are driven by electricity;
the execution component comprises a plunger pump and a centrifugal pump; and
the manifold component comprises a high-pressure valve and a high-pressure manifold in a well site.

15. An evaluation device for evaluating a health state of well site equipment, comprising:
a processor;
a memory; and
one or more computer program modules, wherein the one or more computer program modules are stored in the memory and configured to be executed by the processor to cause the processor to implement the evaluation method for evaluating the health state of the well site equipment according to claim 1.

16. A non-transitory storage medium storing computer-readable instructions, wherein when the computer-readable instructions are executed by a computer, the computer-readable instructions cause the computer to perform the evaluation method for evaluating the health state of the well site equipment according to claim 1.

17. An evaluation method for evaluating a health state of well site equipment, comprising:
obtaining operating parameters of a component to be tested of equipment to be tested in real time while the equipment to be tested is operated in at least one dimension, wherein the at least one dimension comprises an operating data dimension, an environmental data dimension, and a maintenance data dimension;
obtaining evaluation values of a health state of the component to be tested in various dimensions based on the operating parameters of the various dimensions, wherein an operating parameter of the operating data dimension comprises operating data, an operating parameter of the environmental data dimension comprises environmental data, and an operating parameter of the maintenance data dimension comprises maintenance data; and
obtaining a comprehensive evaluation value of the health state of the component to be tested based on the evaluation values of the health state of the component to be tested in the various dimensions,
wherein a calculation formula for an evaluation value of the health state of the component to be tested in any one of the operating data dimension, the environmental data dimension, and the maintenance data dimension is:

$$P = \sum_{t=0}^{T} K_t P_t, \text{ and } \sum_{t=0}^{T} K_t = 1, \quad \text{formula (1)}$$

where $K_t$ is a weight coefficient of a t-th operating parameter, $P_t$ is a scoring coefficient of the t-th operating parameter, t is an integer greater than or equal to 0 and less than or equal to T, and T is a count of the operating parameters and is an integer greater than or equal to 1.

* * * * *